US010845696B2

(12) United States Patent
Song et al.

(10) Patent No.: US 10,845,696 B2
(45) Date of Patent: Nov. 24, 2020

(54) DISPLAY DEVICE

(71) Applicant: LG Display Co., Ltd., Seoul (KR)

(72) Inventors: Hyunjoo Song, Seongnam-si (KR); Yeonjun Oh, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/568,761

(22) Filed: Sep. 12, 2019

(65) Prior Publication Data

US 2020/0103741 A1    Apr. 2, 2020

(30) Foreign Application Priority Data

Sep. 28, 2018    (KR) .................. 10-2018-0116401

(51) Int. Cl.
| | |
|---|---|
| *G03B 21/58* | (2014.01) |
| *G09F 9/30* | (2006.01) |
| *H04N 9/31* | (2006.01) |
| *G03B 21/60* | (2014.01) |
| *G06F 1/16* | (2006.01) |
| *H04M 1/02* | (2006.01) |
| *G03B 21/56* | (2006.01) |

(52) U.S. Cl.
CPC ............. *G03B 21/58* (2013.01); *G03B 21/56* (2013.01); *G03B 21/60* (2013.01); *G06F 1/1601* (2013.01); *G09F 9/301* (2013.01); *H04M 1/0268* (2013.01); *H04N 9/3173* (2013.01)

(58) Field of Classification Search
CPC ........ G03B 21/58; G03B 21/56; G03B 21/60; G06F 1/1601; H01L 51/52; H01L 51/00; H01L 51/5253; H01L 51/0037; H01L 51/0097

USPC ......................................... 359/461
See application file for complete search history.

(56) References Cited

U.S. PATENT DOCUMENTS

| | | | | |
|---|---|---|---|---|
| 5,746,868 | A  * | 5/1998 | Abe .................. | B22F 7/08 156/247 |
| 6,873,458 | B1 * | 3/2005 | Bakkom ............... | G03B 21/58 359/443 |
| 6,927,344 | B1 * | 8/2005 | Gall ..................... | H05K 1/0278 174/254 |
| 10,263,216 | B2 * | 4/2019 | Koo .................... | H01L 51/0097 |
| 2005/0029514 | A1* | 2/2005 | Moriya .............. | H01L 51/0012 257/40 |
| 2005/0140890 | A1* | 6/2005 | Kim, II ............ | G02F 1/133305 349/139 |

(Continued)

FOREIGN PATENT DOCUMENTS

| | | |
|---|---|---|
| KR | 10-2018-0051701 A | 5/2018 |
| KR | 10-2018-0062271 A | 6/2018 |

*Primary Examiner* — Clayton E. LaBalle
*Assistant Examiner* — Kevin C Butler
(74) *Attorney, Agent, or Firm* — Morgan, Lewis & Bockius LLP

(57) ABSTRACT

A display device comprises a display panel having a plurality of pixels and configured to be wound or unwound, and a back cover attached to one surface of the display panel and having a plurality of grooves. The grooves include a plurality of first grooves placed on the one surface of the back cover and a plurality of second grooves placed on the other surface of the back cover opposite to the one surface of the back cover. A depth of each of at least one of the first grooves and at least one of the second grooves is smaller than a maximum thickness of the back cover.

21 Claims, 16 Drawing Sheets

(56) References Cited

U.S. PATENT DOCUMENTS

| | | | |
|---|---|---|---|
| 2005/0253982 A1* | 11/2005 | Paik | G02F 1/1333 349/96 |
| 2006/0279840 A1* | 12/2006 | Yamauchi | G03B 21/56 359/461 |
| 2007/0121209 A1* | 5/2007 | Liang | G03B 21/58 359/461 |
| 2009/0190212 A1* | 7/2009 | Wang | G03B 21/58 359/461 |
| 2009/0284834 A1* | 11/2009 | Chen | G03B 21/58 359/461 |
| 2010/0171138 A1* | 7/2010 | Yamazaki | H05B 33/12 257/98 |
| 2010/0308335 A1* | 12/2010 | Kim | H01L 27/3244 257/59 |
| 2011/0199678 A1* | 8/2011 | Kuroi | G03B 21/58 359/461 |
| 2012/0162760 A1* | 6/2012 | Chen | G03B 21/58 359/461 |
| 2012/0206801 A1* | 8/2012 | Kuroi | G03B 21/58 359/461 |
| 2014/0065430 A1* | 3/2014 | Yamazaki | H01L 27/1214 428/426 |
| 2014/0091288 A1* | 4/2014 | Lee | H01L 51/5256 257/40 |
| 2014/0346451 A1* | 11/2014 | Oh | H01L 51/5246 257/40 |
| 2015/0014820 A1* | 1/2015 | Owada | H01L 29/0657 257/622 |
| 2015/0155505 A1* | 6/2015 | Yamazaki | H01L 51/0097 257/40 |
| 2015/0280129 A1* | 10/2015 | Kim | H01L 51/0097 257/40 |
| 2016/0087237 A1* | 3/2016 | Oh | H01L 51/5203 257/40 |
| 2016/0101593 A1* | 4/2016 | Nam | B32B 3/04 428/213 |
| 2016/0155966 A1* | 6/2016 | Kim | H01L 51/5253 257/40 |
| 2016/0233453 A1* | 8/2016 | Lee | H01L 51/5256 |
| 2017/0179433 A1* | 6/2017 | Nam | H01L 27/3262 |
| 2017/0222178 A1* | 8/2017 | Kang | H01L 51/0097 |
| 2017/0278436 A1* | 9/2017 | Chu | G09F 9/30 |
| 2017/0325343 A1* | 11/2017 | Seo | G06F 1/1652 |
| 2018/0033840 A1* | 2/2018 | Kato | G02B 27/281 |
| 2018/0070466 A1* | 3/2018 | Kim | G09F 9/301 |
| 2018/0070467 A1* | 3/2018 | Kim | G06F 1/1601 |
| 2018/0090702 A1* | 3/2018 | Um | H01L 51/0097 |
| 2018/0341142 A1* | 11/2018 | Choi | H01L 27/3246 |
| 2019/0064578 A1* | 2/2019 | Cho | H01L 51/0097 |
| 2019/0096975 A1* | 3/2019 | Park | H01L 27/3262 |
| 2019/0204874 A1* | 7/2019 | Kim | G06F 1/1643 |

* cited by examiner

DISPLAY DEVICE

CROSS-REFERENCE TO RELATED APPLICATION(S)

This application claims the benefit and priority of Korean Patent Application No. 10-2018-0116401 filed on Sep. 28, 2018, in the Korean Intellectual Property Office, the disclosure of which is incorporated herein by reference as if fully set forth herein.

BACKGROUND

1. Technical Field

The present disclosure relates to a display device, and more particularly, to a rollable display device capable of displaying images even in a rolled state.

2. Description of the Related Art

Display devices used for a computer monitor, a TV, a mobile phone, and other applications include, among others, an organic light-emitting display (OLED) that emits light by itself and a liquid-crystal display (LCD) that requires a separate light source.

As display devices are applied to increasingly diverse fields, such as a computer monitor, a TV, and a personal mobile device, display devices having a large display area and a reduced volume and weight have been studied.

Recently, a rollable display device in which a display part and wiring lines are formed on a flexible substrate made of flexible plastic and which can display an image even in a rolled state has attracted attention as a next-generation display device.

SUMMARY

An object of the present disclosure is to provide a display device including a back cover having high flexibility which can be rolled up along with a display panel.

Another object of the present disclosure is to provide a display device including a back cover that does not reduce the luminous efficiency of a display panel.

Yet another object of the present disclosure is to provide a display device which may reduce or minimize any difference in pressure applied to a display panel from different areas of a back cover when the display device is wound or unwound.

Still another object of the present disclosure is to provide a display device which may reduce any stress generated when the display device is rolled up and may thus reduce or minimize potential damages to a display panel.

Still another object of the present disclosure is to provide a display device including a back cover which is rollable in both a row direction and a column direction.

Still another object of the present disclosure is to provide a display device in which a back cover has improved, even surfaces to reduce or minimize potential damages to a display panel.

Objects of the present disclosure are not limited to the examples noted above, and other objects may be apparent to or understood by those skilled in the art from the present disclosure, including the detailed description and drawings.

To achieve these and other advantages and in accordance with the purpose of the present disclosure, as embodied and broadly described, a display device includes: a display panel having a plurality of pixels and configured to be wound or unwound; and a back cover attached to one surface of the display panel and having a plurality of grooves, wherein the grooves include a plurality of first grooves placed on the one surface of the back cover and a plurality of second grooves placed on the other surface of the back cover opposite to the one surface of the back cover, and wherein a depth of each of at least one of the first grooves and at least one of the second grooves is smaller than a maximum thickness of the back cover.

According to another aspect of the present disclosure, a display device includes: a display panel configured to display an image; a back cover supporting the display panel, and including a plurality of first grooves and a plurality of second grooves, the first grooves being on one surface of the back cover and the second grooves being on another surface of the back cover; a housing part configured to house the display panel and the back cover; and a roller unit configured to wind or unwind the display panel and the back cover at least in a column direction.

Other details of example embodiments are included in the detailed description and the drawings According to the present disclosure, a plurality of grooves may be placed on both surfaces of a back cover such that the back cover can have high flexibility.

According to the present disclosure, the plurality of grooves may be placed selectively on a partial area of the back cover, depending on where the components are attached to the back cover. Thus, the back cover may have both high rigidity and high flexibility.

According to the present disclosure, the back cover can reduce both the stress generated when rolled up in a row direction and the stress generated when rolled up in a column direction.

According to the present disclosure, the surface of a display panel can maintain a flat state without mura.

According to the present disclosure, during winding of a display device, potential damages to the surface of the display panel in contact with a rear surface of the back cover that may be caused by scratches or the like may be reduced or minimized.

The potential benefits and advantages according to the present disclosure are not limited to the examples listed above, and various additional benefits and advantages may be discussed in or apparent from the present disclosure.

It is to be understood that both the foregoing general description and the following detailed description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1A:
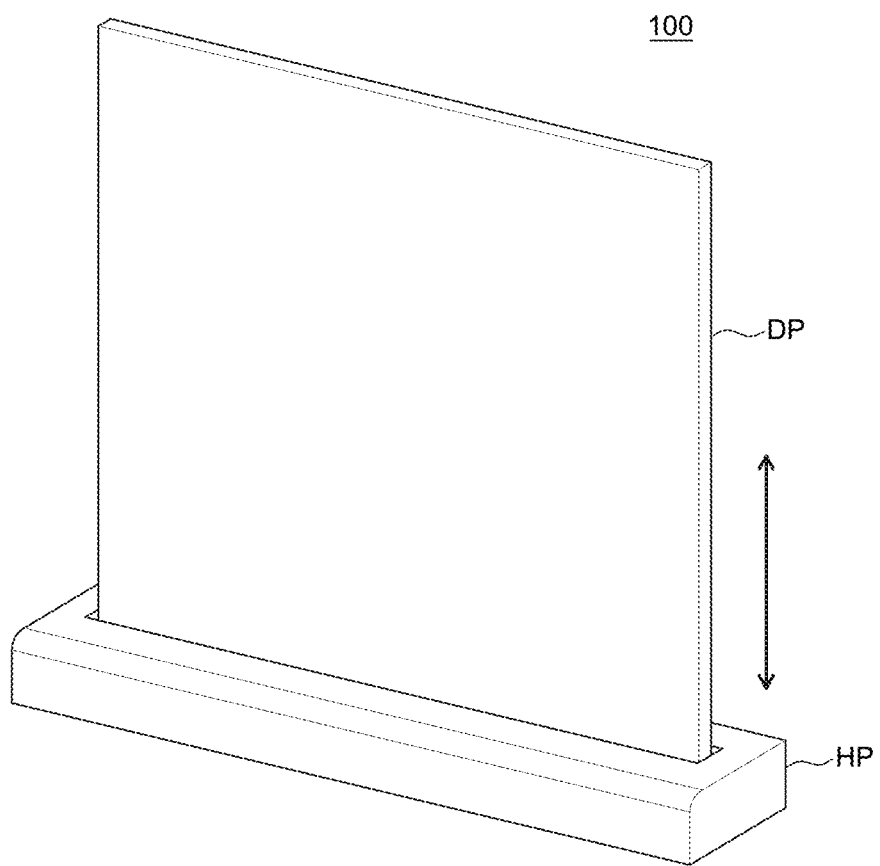
FIG. 1A and FIG. 1B are perspective views of a display device according to an example embodiment of the present disclosure.

Reference will now be made in detail to embodiments of the present disclosure, examples of which are illustrated in the accompanying drawings.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

A shape, a size, a ratio, an angle, and a number disclosed in the drawings for describing embodiments of the present disclosure are merely an example. Thus, the present disclosure is not limited to the illustrated details. Unless otherwise described, like reference numerals refer to like elements throughout. In the following description, when the detailed description of the relevant known function or configuration is determined to obscure an important point of the present disclosure unnecessarily, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range is provided.

In describing a position relationship, when a position relation between two parts is described as, for example, "on," "over," "under," or "next," one or more other parts may be disposed between the two parts unless a more limiting term, such as "immediate(ly)" or "direct(ly)," is used. For example, when an element or layer is disposed "on" another element or layer, a third layer or element may be interposed therebetween.

Although the terms "first," "second," and the like may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

A size and a thickness of each component illustrated in the drawings are illustrated for convenience of description, and the present disclosure is not limited to the size and the thickness of the component illustrated, unless otherwise stated.

Features of various embodiments of the present disclosure may be partially or overall coupled to or combined with each other, and may be variously inter-operated with each other and driven technically, as those skilled in the art can sufficiently understand. Embodiments of the present disclosure may be carried out independently from each other, or may be carried out in association with each other.

Hereinafter, a display device according to example embodiments of the present disclosure will be described in detail with reference to accompanying drawings.

<Display Device-Rollable Display Device>

A rollable display device may refer to a display device which can display an image even in a rolled state. The rollable display device may have higher flexibility than conventional typical display devices. Depending on whether the rollable display device is in use, a shape of the rollable display device may be freely varied. Specifically, when the rollable display device is not in use, the rollable display device may be rolled to be stored with a reduced volume. On the other hand, when the rollable display device is in use, the rolled rollable display device may be unrolled to be used, e.g., to display images.

Figure 1B:
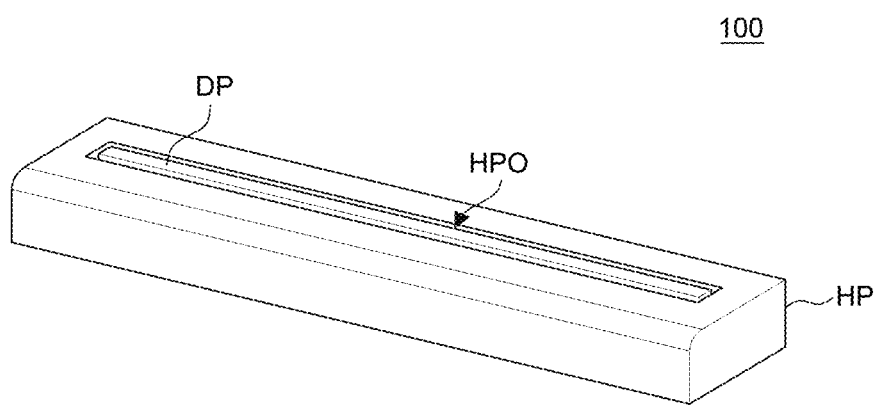

FIG. 1A and FIG. 1B are perspective views of a display device according to an example embodiment of the present disclosure. As shown in FIG. 1A and FIG. 1B, a display device 100 according to an example embodiment of the present disclosure may include a display part DP and a housing part HP.

The display part DP is configured to display images to a user. For example, display elements, circuits for driving the display elements, lines, and other components may be disposed in the display part DP. The display device 100 here according to an example embodiment of the present disclosure is a rollable display device 100. Therefore, the display part DP may be configured to be wound and unwound. For example, the display part DP may include a display panel and a back cover which are flexible so as to be capable of being wound or unwound. The display part DP will be described below in more detail with reference to FIG. 5 and FIG. 6.

The housing part HP serves as a case where the display part DP can be housed. The display part DP may be wound and then housed inside the housing part HP, for example, as shown in FIG. 1B. Also, the display part DP may be unwound and then presented outside the housing part HP, for example, as shown in FIG. 1A.

The housing part HP may include an opening HPO through which the display part DP can move in and out of the housing part HP. The display part DP can move up and down through the opening HPO of the housing part HP.

The display part DP of the display device 100 may be converted from a fully unwound state to a fully wound state, and vice versa.

FIG. 1A shows a fully unwound state of the display part DP of the display device 100. The fully unwound state refers to a state in which the display part DP of the display device 100 is presented outside the housing part HP. That is, the fully unwound state can be viewed as a state in which the display part DP is unwound to a maximum extent so as not to be further unwound and is presented outside the housing part HP in order for the user to watch images on the display device 100.

FIG. 1B shows a fully wound state of the display part DP of the display device 100. The fully wound state refers to a state in which the display part DP of the display device 100 is housed inside the housing part HP so as not to be further wound. That is, the fully wound state may be viewed as a state in which the display part DP is wound and housed inside the housing part HP. When the user is not watching images on the display device 100, it is preferable for the sake of external appearance to have the display part DP housed inside the housing part HP. Further, in the fully wound state in which the display part DP is housed inside the housing part HP, the display device 100 is reduced in volume and easy to transport.

A moving part for winding or unwinding the display part DP to change the display part DP between the fully unwound state and the fully wound state is provided in an example embodiment.

<Moving Part>

Figure 2:
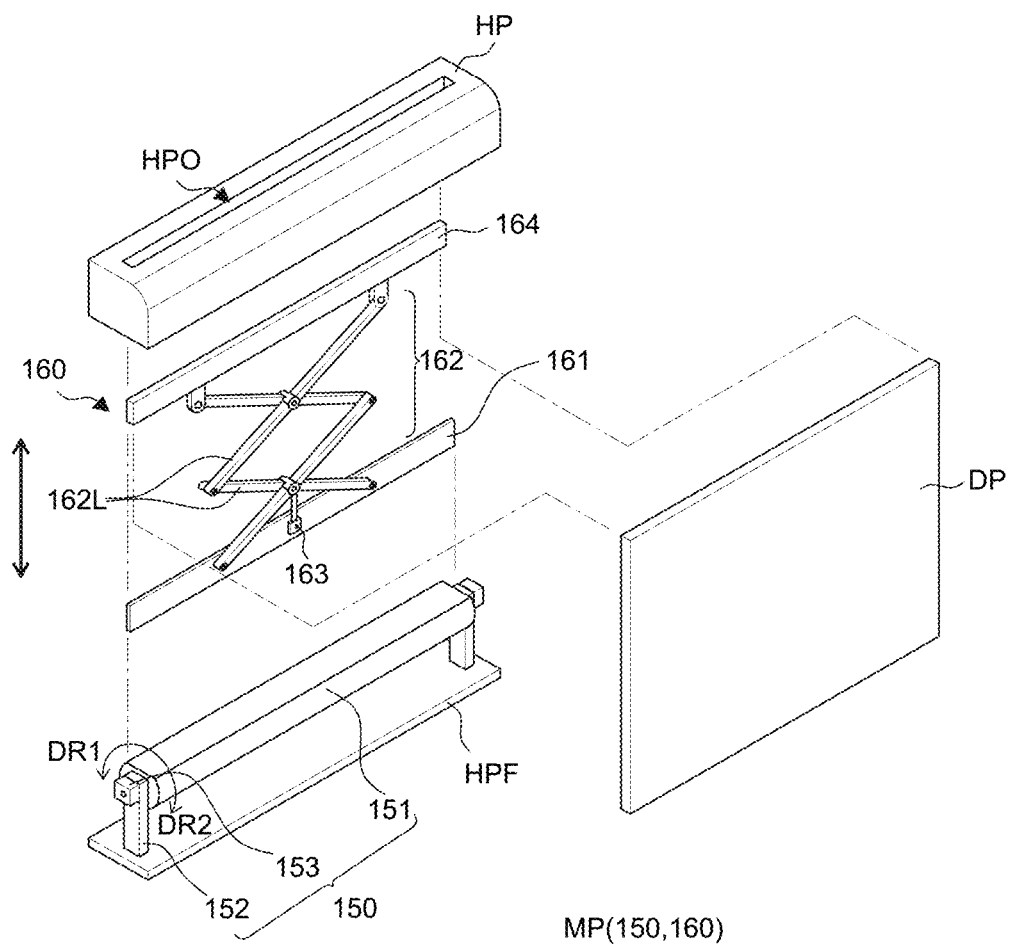
FIG. 2 is an exploded perspective view of the display device according to an example embodiment of the present disclosure.
Figure 3:
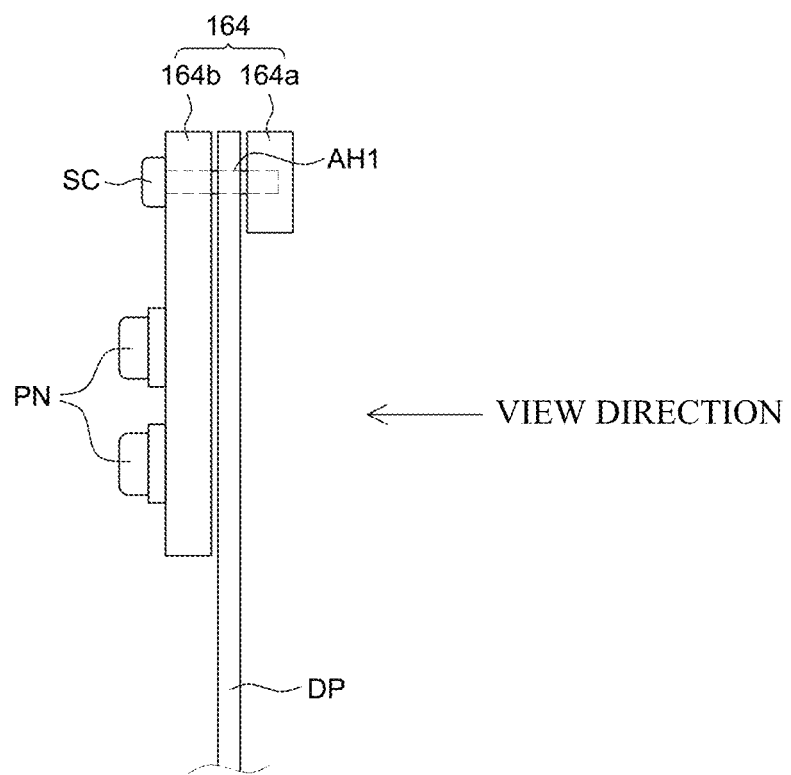
FIG. 3 is a schematic cross-sectional view provided to explain a head bar and a display part of the display device according to an example embodiment of the present disclosure.
Figure 4:
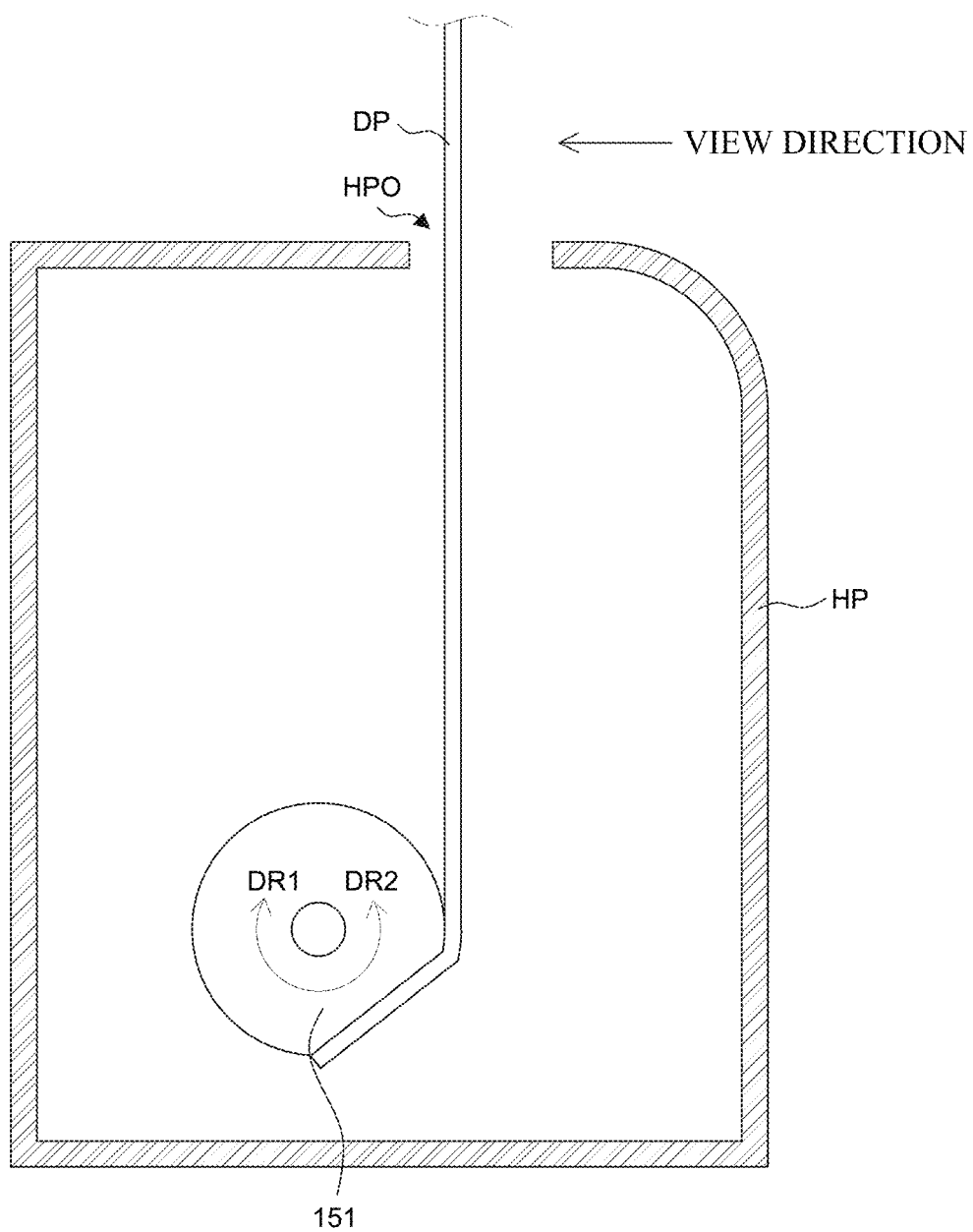
FIG. 4 is a cross-sectional view of the display device according to an example embodiment of the present disclosure.

FIG. 2 is an exploded perspective view of the display device according to an example embodiment of the present disclosure. FIG. 3 is a schematic cross-sectional view provided to explain a head bar and a display part of the display device according to an example embodiment of the present disclosure. FIG. 4 is a cross-sectional view of the display device according to an example embodiment of the present disclosure. FIG. 4 is a schematic cross-sectional view provided to explain a roller 151 and the display part DP of the display device 100 according to an example embodiment of the present disclosure. For convenience of description, FIG. 3 illustrates only a head bar 164 and the display part DP, and FIG. 4 illustrates only the housing part HP, the roller 151, and the display part DP.

First, as illustrated in FIG. 2, a moving part MP may include a roller unit 150 and an elevating unit 160.

The roller unit 150 may wind or unwind the display part DP fixed to the roller unit 150 while rotating in a first direction DR1 or a second direction DR2. The roller unit 150 may include the roller 151, a roller support unit 152, and a roller rotating unit 153.

The roller 151 is a member around which the display part DP may be wound. The roller 151 may have, e.g., a fully or partially cylindrical shape. For example, at least a part of an outer peripheral surface of the roller 151 may be flat, and the other part of the outer peripheral surface of the roller 151 may be curved. The flat part of the roller 151 may be to a portion where a flexible film and a printed circuit board of the display part DP may be placed, and will be described below with reference to FIGS. 9A through 9C.

The lower edge of the display part DP may be fixed to the roller 151. When the roller 151 rotates, the display part DP whose lower edge is fixed to the roller 151 may be wound around the roller 151. On the other hand, when the roller 151 rotates in the opposite direction, the display part DP wound around the roller 151 may be unwound from the roller 151.

As shown in FIG. 4, the roller 151 may have a cylindrical shape overall but may be partially flat. That is, a part of the outer peripheral surface of the roller 151 may be flat, and the other part of the outer peripheral surface may be curved. However, the present disclosure is not limited thereto. The roller 151 may be a completely cylindrical shape or may have any shape around which the display part DP can be wound, but is not limited thereto.

The roller support units 152 may support the roller 151 from both sides of the roller 151. Specifically, the roller support units 152 may be placed on a bottom surface HPF of the housing part HP. Further, upper side surfaces of the respective roller support units 152 may be combined with respective ends of the roller 151. Thus, the roller support units 152 may support the roller 151 to be spaced apart from the bottom surface HPF of the housing part HP. Here, the roller 151 may be rotatably combined with the roller support unit 152.

The roller rotating unit 153 may rotate the roller 151 in the first direction DR1 or the second direction DR2. The roller rotating unit 153 may be placed on one or each of the pair of roller support units 152. For example, the roller rotating unit 153 may be a rotary motor that transfers rotatory power to the roller 151, but is not limited thereto.

The elevating unit 160 may move the display part DP up and down according to driving of the roller unit 150. The elevating unit 160 may include a link support unit 161, a link unit 162, a link elevating unit 163, and the head bar 164.

The link support unit 161 may support the link unit 162 and the link elevating unit 163. Specifically, the link support unit 161 may support the link unit 162 which may move up and down so that the display part DP does not collide with the boundary of the opening HPO of the housing part HP. The link support unit 161 may support the link unit 162 and the display part DP to be movable only up and down but not forward and backward.

The link unit 162 may include a plurality of links 162L hinged to each other. The plurality of links 162L may be rotatably hinged to each other and can be moved up and down by the link elevating unit 163. When the link unit 162 moves up and down, the plurality of links 162L may rotate in a direction to be farther from or closer to each other. More details thereof will be described below with reference to FIG. 4.

The link elevating unit 163 may move the link unit 162 up and down. The link elevating unit 163 may rotate the plurality of links 162L of the link unit 162 to be closer to or farther away from each other. The link elevating unit 163 may move the link unit 162 up or down to move the display part DP connected to the link unit 162 up or down.

Here, driving of the link elevating unit 163 may be synchronized with driving of the roller rotating unit 153. Thus, the roller unit 150 and the elevating unit 160 may be driven at the same time. For example, when the display part DP is switched from the fully unwound state to the fully wound state, the roller unit 150 may be driven to wind the display part DP around the roller 151. At the same time, the elevating unit 160 may rotate the plurality of links 162L of the link unit 162 to move the display part DP down. Further, when the display part DP is switched from the fully wound state to the fully unwound state, the roller unit 150 may be driven to unwind the display part DP from the roller 151. At the same time, the elevating unit 160 may rotate the plurality of links 162L of the link unit 162 to move the display part DP up.

The head bar 164 of the elevating unit 160 may be fixed to the uppermost end of the display part DP. The head bar 164 may be connected to the link unit 162 and may move the display part DP up and down according to a rotation of the plurality of links 162L of the link unit 162. That is, the display part DP can be moved up and down by the head bar 164, the link unit 162, and the link elevating unit 163.

As illustrated in FIG. 3, the head bar 164 may be placed on the uppermost end of the display part DP to cover a portion of a front surface and a portion of a rear surface of the display part DP.

The head bar 164 may include a first head bar 164a and a second head bar 164b. The first head bar 164a may cover a front surface of the display part DP. The first head bar 164a may cover only a part of the front surface adjacent to the uppermost edge of the display part DP in order not to cover images displayed on the front surface of the display part DP.

The second head bar 164b may cover a portion of a rear surface of the display part DP. The second head bar 164b may cover only a part of the rear surface adjacent to the uppermost edge of the display part DP. However, since images are not displayed on the rear surface of the display part DP, the second head bar 164b may overlap a larger portion of the display part DP than the first head bar 164a.

To fasten the display part DP to the first head bar 164a and the second head bar 164b, first alignment holes AH1 may be formed in the display part DP. Further, screws SC may penetrate the first alignment holes AH1 to fasten the first head bar 164a, the display part DP, and the second head bar 164b together.

The second head bar 164b may include pem nuts PN to which the link unit 162 of the elevating unit 160 may be fastened. The second head bar 164b and link unit 162 of the elevating unit 160 may be fastened to each other by the pem nuts PN. Therefore, when the link unit 162 of the elevating unit 160 moves up and down, the second head bar 164b fastened to the link unit 162 and the first head bar 164a, and the display part DP fastened to the second head bar 164b may move up and down together.

FIG. 3 illustrates an example in which the first head bar 164a and the second head bar 164b have a straight line shape. However, the first head bar 164a and the second head bar 164b may have various other shapes. The shape of the first head bar 164a and the second head bar 164b is not limited to the example illustrated in FIG. 3.

Hereafter, an operation of the moving part MP will be described in detail with reference to FIG. 4.

As shown in FIG. 4, the lower edge of the display part DP may be connected to the roller 151. Further, when the roller 151 is rotated by the roller rotating unit 153 (FIG. 2) in the first direction DR1, i.e., in a clockwise direction, the display part DP may be wound around the roller 151 so that the rear surface of the display part DP can be in close contact with a surface of the roller 151.

On the other hand, when the roller 151 is rotated by the roller rotating unit 153 in the second direction DR2, i.e., in a counterclockwise direction, the display part DP wound around the roller 151 may be unwound from the roller 151 and then presented outside the housing part HP.

In some example embodiments, the moving part MP different in structure from the above-described example moving part MP may be employed in the display device 100. That is, the roller unit 150 and the elevating unit 160 may be changed in configuration from the above-described example as long as the display part DP can be wound and unwound. Some of their components may be omitted or modified, or other components may be added.

<Display Part>

Figure 5:
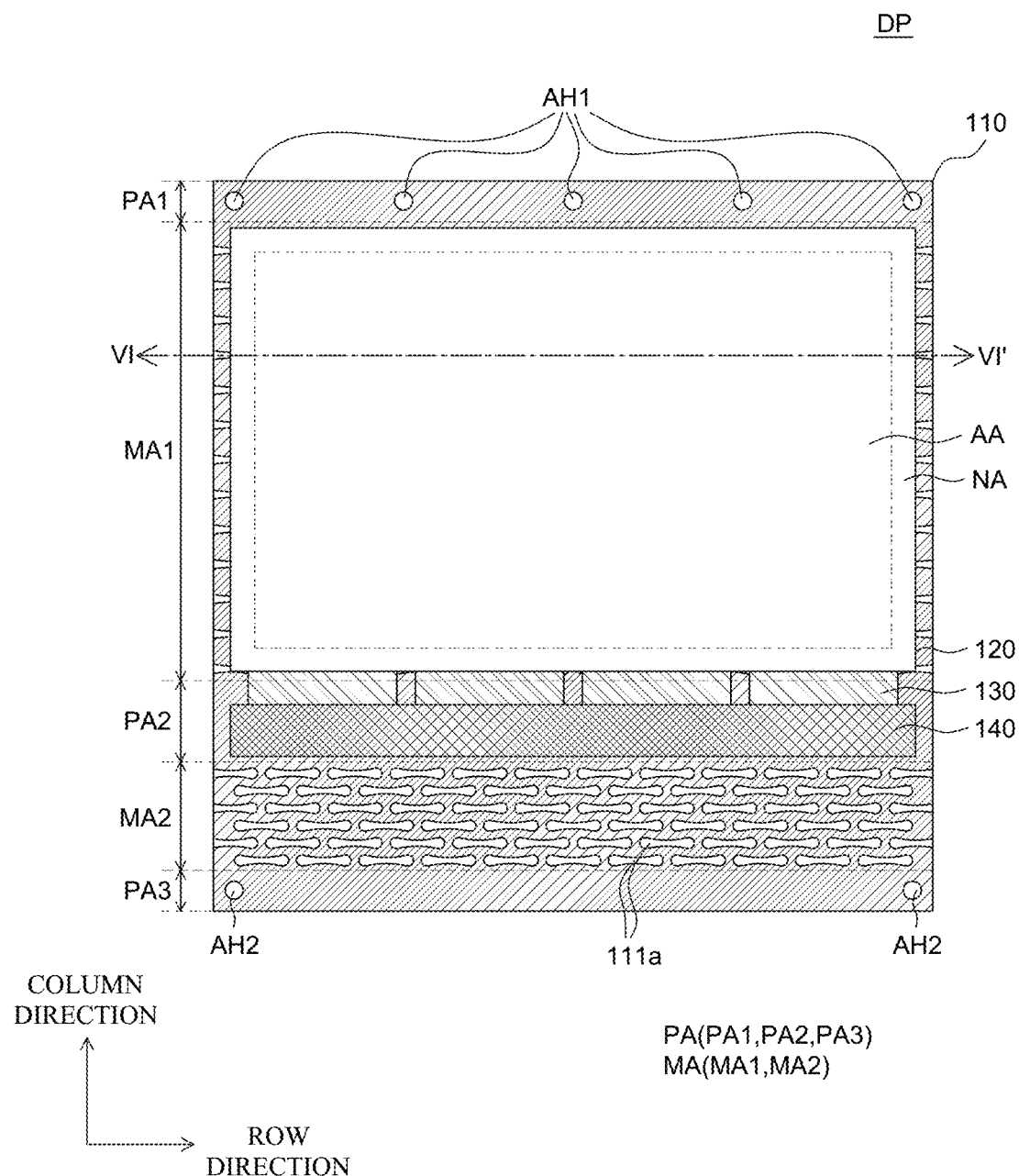
FIG. 5 is a plan view of a display part of the display device according to an example embodiment of the present disclosure.
Figure 6:
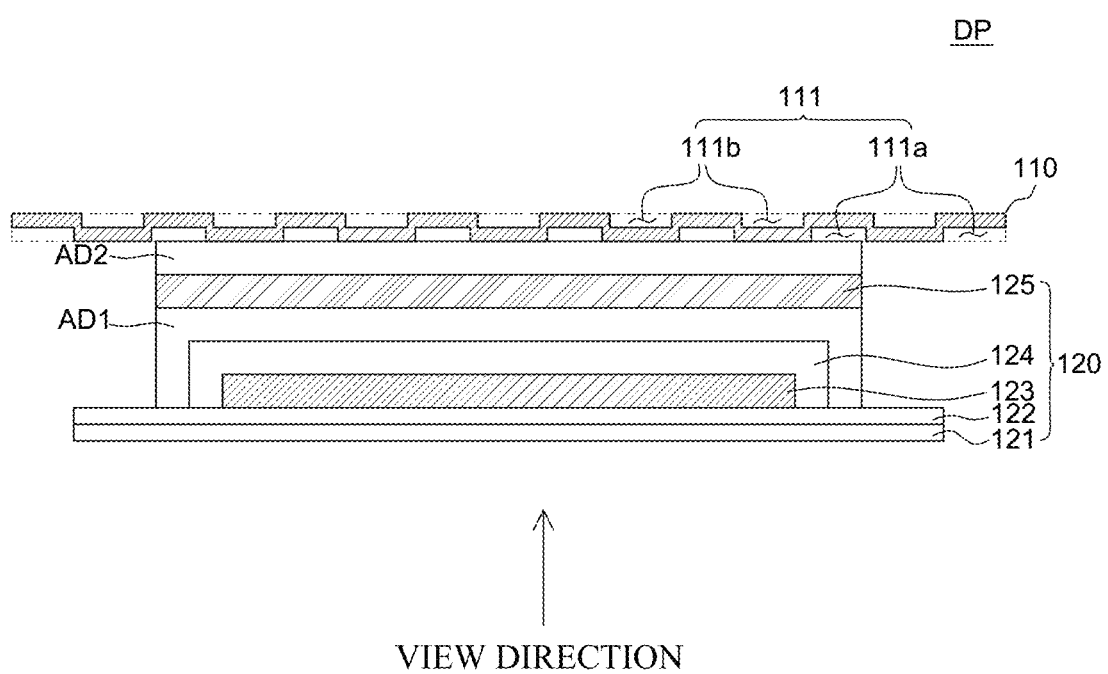
FIG. 6 is a cross-sectional view as taken along a line VI-VI' of FIG. 5.

FIG. 5 is a plan view of a display part DP of the display device according to an example embodiment of the present disclosure. FIG. 6 is a cross-sectional view taken along a line VI-VI' of FIG. 5.

As illustrated in FIG. 5, the display part DP may include a back cover 110, a display panel 120, flexible films 130, and a printed circuit board 140.

The display panel 120 may be configured to display images to the user. In the display panel 120, display elements for displaying images, driving elements for driving the display elements, lines for transmitting various signals to the display elements and the driving elements, and other related elements may be disposed. Different types of display elements may be employed depending on the kind of the display panel 120. For example, if the display panel 120 is an organic light emitting display panel, the display elements may be organic light emitting elements, composed of an anode, an organic emission layer, and a cathode. As another example, if the display panel 120 is a liquid crystal display panel, the display elements may be liquid crystal display elements. Hereinafter, the display panel 120 may be described as an organic light emitting display panel as an example, but the display panel 120 is not limited to the organic light emitting display panel. Further, since the display device 100 according to an example embodiment of the present disclosure is a rollable display device, the display panel 120 may be implemented as a flexible display panel to be wound around or unwound from the roller 151.

The display panel 120 may include an active area AA and a non-active area NA.

The active area AA refers to an area where an image may be displayed on the display panel 120. In the active area AA, a plurality of sub-pixels and a circuit for driving the plurality of sub-pixels may be disposed. The plurality of sub-pixels may represent a minimum unit of the active area AA, and a display element may be disposed in each of the plurality of sub-pixels. For example, an organic light emitting element composed of an anode, an organic emission layer, and a cathode may be disposed in each of the plurality of sub-pixels, but the present disclosure is not limited thereto. Further, the circuit for driving the plurality of sub-pixels may include, without limitation, a driving element and a line. For example, the circuit may be composed of such elements as a thin film transistor (TFT), a storage capacitor, a gate line, and a data line, but is not limited thereto.

The non-active area NA of the display part 120 is an area where no image can be displayed. In the non-active area NA, various lines, circuits, and related elements for driving the organic light emitting elements in the active area AA may be disposed. For example, in the non-active area NA, link lines for transmitting signals to the plurality of sub-pixels and circuits in the active area AA or driver ICs such as a gate driver IC and a data driver IC may be disposed. However, non-active area of the present disclosure is not limited thereto.

The flexible films 130 may include various components on a flexible base film and may serve to supply signals to the plurality of sub-pixels and circuits in the active area AA. The flexible films 130 may be electrically connected to the display panel 120. The flexible films 130 may be placed at one end of the non-active area NA of the display panel 120 and may supply power voltage, data voltage, or other voltages or signals to the plurality of sub-pixels and circuits in the active area AA. FIG. 5 illustrates four flexible films 130. However, the number of flexible films 130 is not limited to the illustrated example, and the number of flexible films may vary depending on the design.

For example, driver ICs, such as a gate driver IC and a data driver IC, may be disposed on the flexible films 130. The driver ICs may be configured to process data for displaying an image and a driving signal for processing the data. The driver ICs may be mounted in a Chip On Glass (COG) method, a Chip On Film (COF) method, a Tape Carrier Package (TCP), or other similar methods. For convenience of description, the driver ICs may be described, for example, as being mounted on the flexible films 130 in the COF method, but the present disclosure is not limited thereto.

The printed circuit board 140 may be disposed on one ends of the flexible films 130 and connected to the flexible films 130. The printed circuit board 140 may be configured to supply signals to the driver ICs. The printed circuit board 140 may supply various signals, such as a drive signal, a data signal, or other signals, to the driver ICs. In the printed circuit board 140, various components may be disposed. For example, a timing controller and a power supply unit, among others, may be disposed on the printed circuit board 140. FIG. 5 illustrates a single printed circuit board 140 as an example. However, the number of printed circuit boards 140 is not limited to the illustrated example and may vary depending on the design.

Although not illustrated in FIG. 5, one or more additional printed circuit boards connected to the printed circuit board 140 may be further disposed. For example, the printed circuit board 140 may be referred to as a source printed circuit board (source PCB) S-PCB on which a data driver is mounted. An additional printed circuit board connected to the printed circuit board 140 may be referred to as a control printed circuit board (control PCB) C-PCB on which a timing controller or the like is mounted. The additional printed circuit board may be disposed inside the roller 151, or may be disposed within the housing part HP outside the roller 151.

The back cover 110 may be disposed on rear surfaces of the display panel 120, the flexible films 130, and the printed circuit board 140, and may support the display panel 120, the flexible films 130, and the printed circuit board 140. Thus, the back cover 110 may be larger in size than the display panel 120. The back cover 110 can protect the other components of the display part DP against the external environment. The back cover 110 may be formed of a rigid material, but at least a part of the back cover 110 may have flexibility to be wound or unwound along with the display panel 120. For example, the back cover 110 may be formed of a metal material, such as Steel Use Stainless (SUS) or Invar, a plastic material, or other similar materials. However, the material of the back cover 110 is not limited thereto. Various different materials may be employed for the back cover 110 depending on the design as long as they can satisfy property characteristics, such as an amount of thermal deformation, a radius of curvature, and rigidity.

As shown in FIG. 6, the display panel 120 may include a substrate 121, a buffer layer 122, a pixel unit 123, an encapsulation layer 124, and an encapsulation substrate 125.

The substrate 121 may serve as a base member to support various components of the display panel 120 and may be formed of an insulating material. The substrate 121 may be formed of a flexible material so that the display panel 120 may be wound or unwound. For example, the substrate 121 may be formed of a plastic material, such as polyimide (PI).

The buffer layer 122 may suppress diffusion of moisture and/or oxygen permeating from the outside of the substrate 121. The buffer layer 122 may be formed as a single layer or a multilayer of silicon oxide (SiOx) and silicon nitride (SiNx), but is not limited thereto.

The pixel unit 123 may include a plurality of organic light emitting elements and circuits for the organic light emitting elements. The pixel unit 123 may be disposed in an area corresponding to the active area AA. Each organic light emitting element may include an anode, an organic emission layer, and a cathode.

The anode may supply holes into the organic emission layer and may be formed of a conductive material having a high work function. For example, the anode may be formed of tin oxide (TO), indium tin oxide (ITO), indium zinc oxide (IZO), indium zinc tin oxide (ITZO), or the like, but is not limited thereto.

The organic emission layer may receive holes from the anode and electrons from the cathode, and emit light. The organic emission layer may be one of a red organic emission layer, a green organic emission layer, a blue organic emission layer, and a white organic emission layer, depending on the color of light emitted from the organic emission layer. If the organic emission layer is a white organic emission layer, color filters of various colors may be further provided.

The cathode may supply electrons into the organic emission layer and may be formed of a conductive material having a low work function. For example, the cathode may be formed of any one or more materials selected from a group of metals, such as magnesium (Mg), silver (Ag), and aluminum (Al) and alloys thereof, but is not limited thereto.

The display panel 120 may be classified into a top emission type or a bottom emission type according to a transmission direction of light emitted from the organic light emitting element.

In the top emission type, light emitted from the organic light emitting element may be discharged away from the substrate 121 on which the organic light emitting element is disposed. If the display panel 120 is of top emission type, a reflective layer may be further provided under the anode. This is to discharge light emitted from the organic light emitting element away from the substrate 121, i.e., toward the cathode.

In the bottom emission type, light emitted from the organic light emitting element is discharged toward the substrate 121 on which the organic light emitting element is formed. If the display panel 120 is of bottom emission type, the anode may be formed of a transparent conductive material only and the cathode may be formed of a metal material having high reflectivity. This is to discharge light emitted from the organic light emitting element toward the substrate 121.

Hereafter, for convenience of description, the display device 100 according to an example embodiment of the present disclosure will be described as a bottom emission type display device, but is not limited thereto.

In the pixel unit 123, a circuit for driving organic light emitting elements may be disposed. The circuit may be composed of a TFT, a storage capacitor, a gate line, a data line, a power line, and possibly other components. However, the components of the circuit may vary depending on the design of the display device 100.

The encapsulation layer 124 may be disposed on and cover the pixel unit 123. The encapsulation layer 124 may seal the organic light emitting elements of the pixel unit 123.

The encapsulation layer 124 may protect the organic light emitting elements of the pixel unit 123 against external moisture, oxygen, and impacts. The encapsulation layer 124 may be formed by alternately laminating a plurality of inorganic layers and a plurality of organic layers. For example, the inorganic layers may be formed of inorganic materials, such as silicon nitride (SiNx), silicon oxide (SiOx), and aluminum oxide (AlOx), but are not limited thereto. For example, the organic layers may be formed of epoxy-based or acryl-based polymers, but are not limited thereto.

The encapsulation substrate 125 may be disposed on the encapsulation layer 124. The encapsulation substrate 125 may protect the organic light emitting elements of the pixel unit 123 together with the encapsulation layer 124. The encapsulation substrate 125 may protect the organic light emitting elements of the pixel unit 123 against external moisture, oxygen, impacts, and the like. The encapsulation substrate 125 may be formed of a metal material which has high corrosion resistance and can be easily processed into a foil or a thin film. Examples of the metal material may include aluminum (Al), nickel (Ni), chromium (Cr), an alloy of iron (Fe) and Ni, and other similar materials. Since the encapsulation substrate 125 may be formed of a metal material, the encapsulation substrate 125 can be implemented in the form of an ultra-thin film and can provide high resistance to external impacts and scratches.

A first adhesive layer AD1 may be disposed between the encapsulation layer 124 and the encapsulation substrate 125. The first adhesive layer AD1 may bond the encapsulation layer 124 and the encapsulation substrate 125 to each other. The first adhesive layer AD1 may be formed of an adhesive material and may be a thermosetting or naturally-curable adhesive. For example, the first adhesive layer AD1 may be formed of an optical clear adhesive (OCA), a pressure sensitive adhesive (PSA), or the like, but is not limited thereto.

The first adhesive layer AD1 may be disposed to cover the encapsulation layer 124 and the pixel unit 123. That is, the pixel unit 123 may be sealed by the buffer layer 122 and the encapsulation layer 124, and the encapsulation layer 124 and the pixel unit 123 may be sealed by the buffer layer 122 and the first adhesive layer AD1. The first adhesive layer AD1 may protect the organic light emitting elements of the pixel unit 123 against external moisture, oxygen, impacts, and the like, together with the encapsulation layer 124 and the encapsulation substrate 125. In this case, the first adhesive layer AD1 may further contain a moisture absorbent. The moisture absorbent may include hygroscopic particles and may absorb moisture, oxygen, and the like from the outside to minimize permeation of moisture and oxygen into the pixel unit 123.

The back cover 110 may be disposed on the encapsulation substrate 125. The back cover 110 may be disposed to be in contact with the encapsulation substrate 125 of the display panel 120 to protect the display panel 120. The back cover 110 may be formed of a rigid material to protect the display panel 120.

The back cover 110 may include a plurality of grooves 111 including a plurality of first grooves 111a and a plurality of second grooves 111b. The plurality of grooves 111 may enable the back cover 110 to have flexibility. The plurality of grooves 111 may be flexibly deformed and enable the back cover 110 to be more easily wound around or unwound from the roller 151 along with the display panel 120. The plurality of first grooves 111a may be placed on one surface of the back cover 110 facing the display panel 120, and the plurality of second grooves 111b may be placed on the other surface of the back cover 110 opposite the one surface of the back cover 110. Details thereof will be described later with reference to FIG. 7A through FIG. 8.

A second adhesive layer AD2 may be disposed between the encapsulation substrate 125 and the back cover 110. The second adhesive layer AD2 may bond the encapsulation substrate 125 and the back cover 110 to each other. The second adhesive layer AD2 may be formed of an adhesive material and may be a thermosetting or naturally-curable adhesive. For example, the second adhesive layer AD2 may be formed of an optical clear adhesive (OCA), a pressure sensitive adhesive (PSA), or the like, but is not limited thereto.

FIG. 6 illustrates that the plurality of first grooves 111a of the back cover 110 is not filled with the second adhesive layer AD2. However, some or all of the plurality of first grooves 111a of the back cover 110 may be filled with the second adhesive layer AD2. If the second adhesive layer AD2 fills in the plurality of first grooves 111a of the back cover 110, a contact area between the second adhesive layer AD2 and the back cover 110 increases. Thus, it is possible to prevent or suppress separation between the back cover 110 and the display panel 120.

Although not illustrated in FIG. 6, a transparent film may be further disposed on a front surface of the substrate 121 (i.e., a lower surface of the substrate 121 as illustrated in FIG. 6). The transparent film may function to protect a front surface or a viewing surface of the display panel 120 or minimize reflection of external light incident on the display panel 120. For example, the transparent film may be at least one of a polyethyleneterephthalate (PET) film, an anti-reflection film, a polarizing film, and a transmittance controllable film, but is not limited thereto.

Hereafter, the back cover 110 will be described in more detail with reference to FIGS. 7A through 8.

<Detailed Configuration of an Example Back Cover>

Figure 7A:
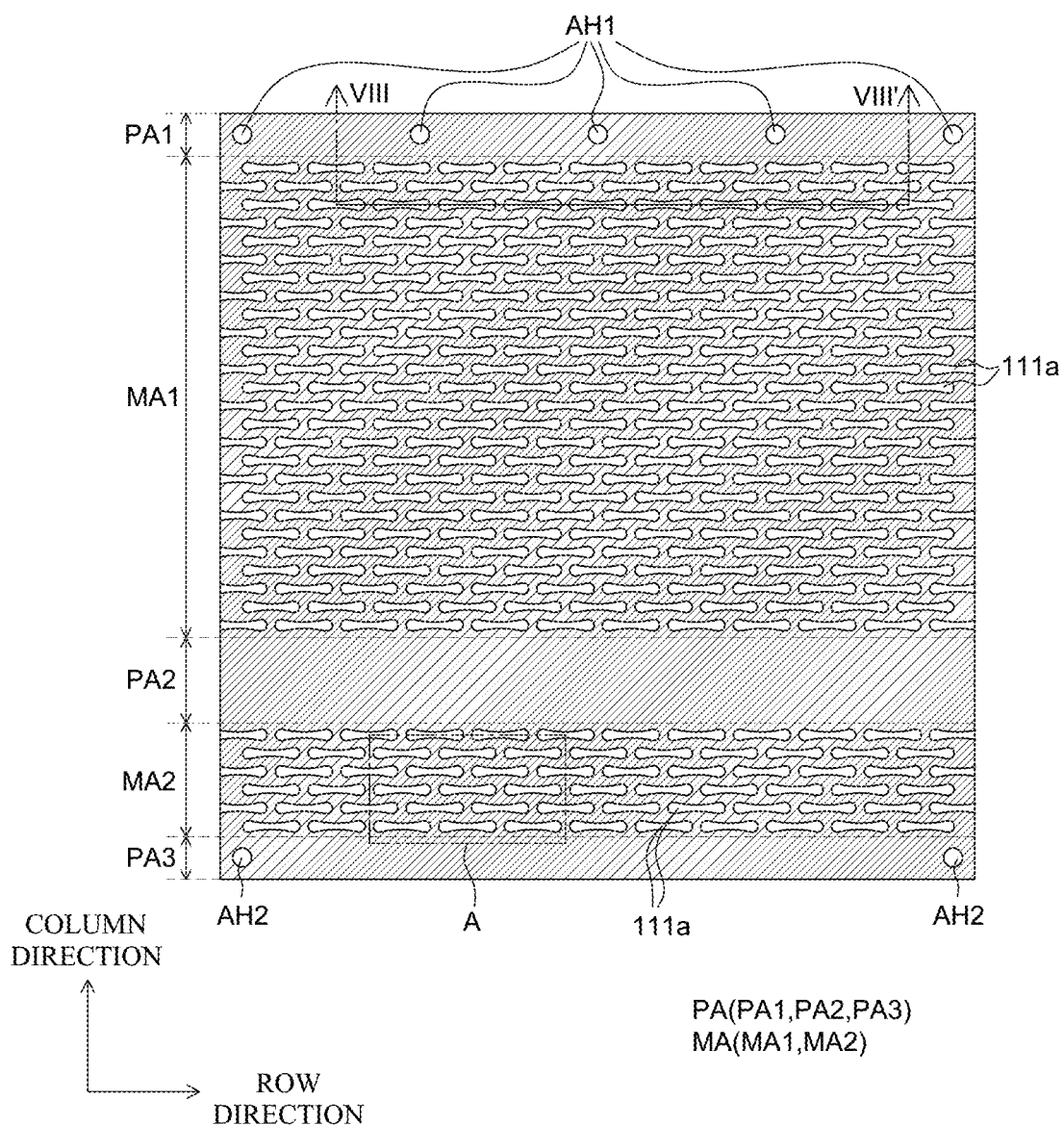
FIG. 7A is a plan view of a back cover of the display device according to an example embodiment of the present disclosure.
Figure 7B:
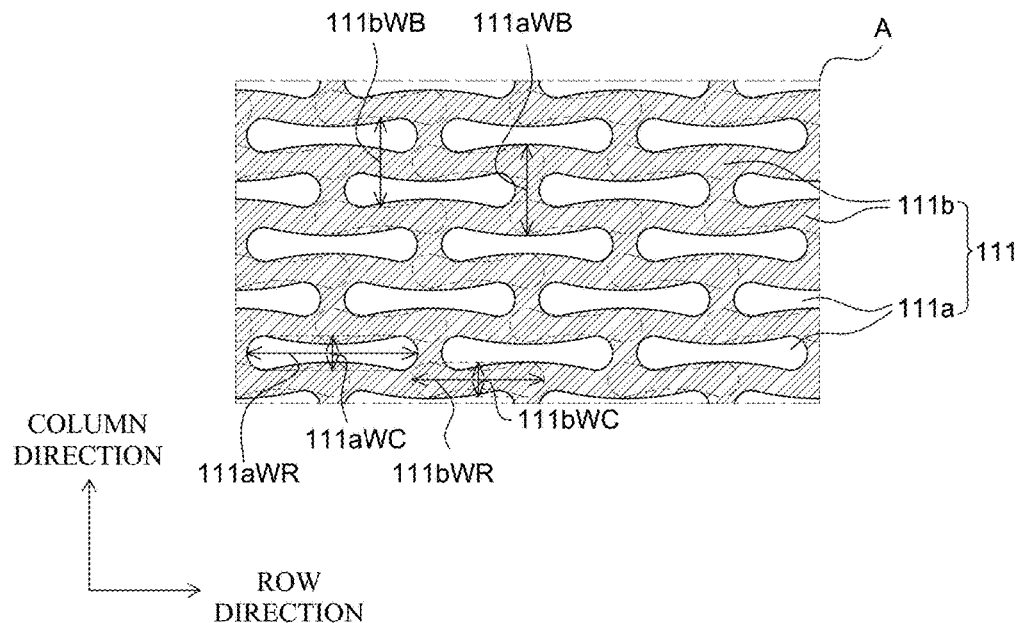
FIG. 7B is an enlarged view of a region "A" of FIG. 7A.

FIG. 7A is a plan view of a back cover of the display device according to an example embodiment of the present disclosure. FIG. 7B is an enlarged view of a region "A" of FIG. 7A. FIG. 8 is a cross-sectional view as taken along a line VIII-VIII' of FIG. 7. FIG. 7A and FIG. 7B are plan views of one surface of the back cover 110 facing the display panel 120. For convenience of description, FIG. 7A illustrates only the plurality of first grooves 111a by a solid line among the plurality of grooves 111. FIG. 7B illustrates the plurality of first grooves 111a by a solid line and the plurality of second grooves 111b by a dotted line among the plurality of grooves 111.

As shown in FIG. 7A, the back cover 110 may include a plurality of supporting areas PA and a plurality of flexible areas MA. In the plurality of supporting areas PA, the plurality of grooves 111 is not disposed. In the plurality of flexible areas MA, the plurality of grooves 111 may be disposed. Specifically, a first supporting area PA1, a first flexible area MA1, a second supporting area PA2, a second flexible area MA2, and a third supporting area PA3 may be disposed in sequence from the upper end of the back cover 110 to the lower end.

The first supporting area PA1 may be the uppermost area of the back cover 110 and may be fixed to the head bar 164. The first supporting area PA1 may include the first alignment holes AH1 to be fastened to the head bar 164. Further, as described above with reference to FIG. 3, the screws SC penetrating the head bar 164 and the first alignment holes AH1 may be provided to fasten the head bar 164 to the first supporting area PA1 of the back cover 110. Further, since the first supporting area PA1 may be fastened to the head bar 164, the back cover 110 can move up or down as the link unit 162 fastened to the head bar 164 moves up or down. Accordingly, the display panel 120 attached to the back cover 110 may also move up or down. FIG. 7A illustrates five first alignment holes AH1 as an example, but the number of first alignment holes AH1 is not limited to the illustrated example. Further, FIG. 7A illustrates that the back cover 110 may be fastened to the head bar 164 using the first alignment holes AH1. However, the present disclosure is not limited thereto. The back cover 110 may be fixed to the head bar 164 without alignment holes.

The first flexible area MA1 may extend from the first supporting area PA1 to the lower side of the back cover 110. In the first flexible area MA1, the plurality of grooves 111 may be disposed. The display panel 120 may be attached to the first flexible area MA1. Specifically, the first flexible area MA1 may be wound around or unwound from the roller 151 along with the display panel 120. The first flexible area MA1 may overlap at least the display panel 120 among the other components of the display part DP.

The second supporting area PA2 may extend from the first flexible area MA1 to the lower side of the back cover 110. The flexible films 130 connected to one end of the display panel 120 and the printed circuit board 140 may be attached to the second supporting area PA2.

The second supporting area PA2 may support the flexible films 130 and the printed circuit board 140 to maintain a flat state and not to be bent when wound around the roller 151. This is to protect the flexible films 130 and the printed circuit board 140.

Further, when the second supporting area PA2 is wound around the roller 151, the second supporting area PA2 may be disposed on the flat part of outer peripheral surface of the roller 151. Therefore, the second supporting area PA2 can maintain a flat state regardless of whether it is wound around or unwound from the roller 151. The flexible films 130 and the printed circuit board 140 disposed in the second supporting area PA2 can also maintain a flat state.

The second flexible area MA2 may extend from the second supporting area PA2 to the lower side of the back cover 110. In the second flexible area MA2, the plurality of grooves 111 may be disposed. The second flexible area MA2 may be provided to enable the active area AA of the display panel 120 to be presented outside the housing part HP. For example, when the back cover 110 and the display panel 120 are in a fully unwound state, an area ranging from the third supporting area PA3 of the back cover 110 fixed to the roller 151 to the second supporting area PA2 to which the flexible films 130 and the printed circuit board 140 are attached may remain inside the housing part HP. At the same time, the first flexible area MA1 to which the display panel 120 is attached may be presented outside the housing part HP. In this case, if a length from the third supporting area PA3 fixed to the roller 151 to the second flexible area MA2 and to the second supporting area PA2 is smaller than a length from the third supporting area PA3 to the opening HPO of the housing part HP, a part of the first flexible area MA1 to which the display panel 120 is attached may remain inside the housing part HP even in a fully unwound state. In this case, since a part of a lower end of the active area AA of the display panel 120 may remain inside the housing part HP, it may be more difficult for the user to watch the full image displayed on the display panel 120. Therefore, the length from the third supporting area PA3 fixed to the roller 151 to the second flexible area MA2 and to the second supporting area PA2 may be designed to be at least equal to the length from the third supporting area PA3 fixed to the roller 151 to the opening HPO of the housing part HP.

The third supporting area PA3 may extend from the second flexible area MA2 to the lower side of the back cover 110. The third supporting area PA3 may be the lowermost area of the back cover 110 and be fixed to the roller 151. The third supporting area PA3 may include second alignment holes AH2 to be fastened to the roller 151. For example, screws SC penetrating the roller 151 and the second alignment holes AH2 may be provided to fasten the roller 151 to the third supporting area PA3 of the back cover 110. Further, since the third supporting area PA3 may be fastened to the roller 151, the back cover 110 may be wound around or unwound from the roller 151. FIG. 7A illustrates two second alignment holes AH2 as an example, but the number of second alignment holes AH2 is not limited to this illustrated example.

Meanwhile, the plurality of grooves 111 formed in the plurality of flexible areas MA is not formed in the first supporting area PA1, the second supporting area PA2, and the third supporting area PA3. The first alignment holes AH1 and the second alignment holes AH2 may be formed in the first supporting area PA1 and the third supporting area PA3, respectively. However, the plurality of grooves 111 formed in the plurality of flexible areas MA is not formed in the first supporting area PA1, the second supporting area PA2, and the third supporting area PA3. Further, the first alignment holes AH1 and the second alignment holes AH2 may be different in shape from the plurality of grooves 111. The first supporting area PA1 may be fixed to the head bar 164, the second supporting area PA2 may support the flexible films 130 and the printed circuit board 140, and the third supporting area PA3 may be fixed to the roller 151. Thus, the first supporting area PA1, the second supporting area PA2, and the third supporting area PA3 may have have higher rigidity than the plurality of flexible areas MA. Specifically, since the first supporting area PA1, the second supporting area PA2, and the third supporting area PA3 have higher rigidity, the first supporting area PA1 and the third supporting area PA3 can be securely fixed to the head bar 164 and the roller 151, respectively. Further, the second supporting area PA2 can maintain the flexible films 130 and the printed circuit board 140 flat and keep them from being bent to protect them. Therefore, the display part DP may be fixed to the roller 151 and the head bar 164 of the moving part MP, and may move in and out of the housing part HP according to an operation of the moving part MP. Also, the display part DP can protect the flexible films 130 and the printed circuit board 140.

During winding or unwinding of the display part DP, the plurality of grooves 111 disposed in the plurality of flexible areas MA of the back cover 110 may be deformed by stress applied to the display part DP. Specifically, during winding or unwinding of the display part DP, the plurality of flexible areas MA of the back cover 110 may be deformed as the plurality of grooves 111 contracts or expands. Further, since the plurality of grooves 111 may contract or expand, a slip phenomenon of the display panel 120 disposed on the plurality of flexible areas MA of the back cover 110 may be minimized or suppressed. Therefore, stress applied to the display panel 120 can be minimized or suppressed.

During winding of the display panel 120 and the back cover 110, there may be a difference in length between the display panel 120 and the back cover 110 which are wound around the roller 151. This is because there may be a difference in radius of curvature between the display panel 120 and the back cover 110. For example, the back cover 110 and the display panel 120 may need to have different lengths to be wound once around the roller 151. That is, the display panel 120 may be disposed farther from the roller 151 than the back cover 110 when wound, and the display panel 120 may thus have a larger length to be wound once around the roller 151 than the back cover 110. As such, a difference in radius of curvature during winding of the display part DP may cause a difference in length for winding of the back cover 110 and the display panel 120. Thus, the display panel 120 attached to the back cover 110 may slip and move from its original position. In this case, a phenomenon that the display panel 120 slips from the back cover 110 due to differences in stress and radius of curvature caused by winding may be referred to as a slip phenomenon. If an excessive slip occurs, the display panel 120 may be detached from the back cover 110 or defects such as cracks may occur.

In this case, in the display device 100 according to an example embodiment of the present disclosure, even when the display part DP is applied with stress by being wound or unwound, the plurality of grooves 111 of the back cover 110 may be flexibly deformed to reduce stress applied to the back cover 110 and the display panel 120. For example, when the back cover 110 and the display panel 120 are wound around the roller 151, stress that could deform the back cover 110 and the display panel 120 in the up and down directions may be applied thereto. In this case, the plurality of grooves 111 of the back cover 110 may expand in the up and down directions of the back cover 110, and the length of the back cover 110 may also be flexibly changed. Therefore, during winding of the back cover 110 and the display panel, the plurality of grooves 111 of the back cover 110 may compensate for a difference in length between the back cover 110 and the display panel 120 caused by a difference in radius of curvature. Further, during winding of the back cover 110 and the display panel 120, the plurality of grooves 111 may be deformed to reduce stress applied to the display panel 120 from the back cover 110.

As illustrated in FIG. 7B, the plurality of grooves 111 may have maximum row-direction widths 111aWR and 111bWR which are larger than maximum column-direction widths 111aWC and 111bWC, respectively. That is, as shown in FIG. 7B, the maximum widths 111aWR and 111bWR of the plurality of grooves 111 in a transverse direction (i.e., a row direction) may be larger than the maximum widths 111aWC and 111bWC of the plurality of grooves 111 in a vertical direction (i.e., a column direction).

As the row-direction widths 111aWR and 111bWR of the plurality of grooves 111 increase, it may become easier for the plurality of flexible areas MA of the back cover 110 to be flexibly deformed. Specifically, during winding of the back cover 110, the back cover 110 may be bent in the column direction, and stress may be applied to expand the plurality of grooves 111 in the column direction. In this case, if the row-direction widths 111aWR and 111bWR of the plurality of grooves 111 increase, the column-direction widths of the plurality of grooves 111 may increase by a larger amount when the plurality of grooves 111 is stretched in the column direction. Further, as the plurality of grooves 111 expands in the column direction, stress applied to the plurality of flexible areas MA may be reduced. Therefore, by increasing the row-direction widths 111aWR and 111bWR of the plurality of grooves 111, the plurality of flexible areas MA of the back cover 110 can be more easily be wound or unwound, and stress applied to the plurality of flexible areas MA can be reduced.

FIG. 5, FIG. 7A, and FIG. 7B illustrate the plurality of grooves 111 as having a dumbbell shape as an example. However, as long as the maximum row-direction widths 111aWR and 111bWR of the plurality of grooves 111 are larger than the maximum column-direction widths 111aWC and 111bWC, the shape of the plurality of grooves 111 is not limited to the illustrated example. For example, the plurality of grooves 111 may have at least one of a rectangular shape, an oval shape, a ribbon shape, a dumbbell shape, and a diamond shape, but is not limited thereto.

The larger the column-direction widths 111aWC and 111bWC of the plurality of grooves 111, the easier it may be to form the plurality of grooves 111 in the manufacturing process. However, if the column-direction widths 111aWC and 111bWC of the plurality of grooves 111 increase, the areas of the plurality of first grooves 111a and the plurality of second grooves 111b may increase in the front and rear surfaces of the back cover 110. Particularly, if the area of the plurality of first grooves 111a increases in the first flexible area MA1 on the front surface of the back cover 110, a contact area between the display panel 120 and the back cover 110 which are attached to the first flexible area MA1 on the front surface of the back cover 110 would decrease. Further, if a contact area between the display panel 120 and the back cover 110, i.e., a contact area between the front surface of the back cover 110 and the second adhesive layer AD2, decreases, the back cover 110 may be separated from the second adhesive layer AD2. Therefore, the column-direction widths 111aWC and 111bWC of the plurality of grooves 111, particularly the column-direction width 111aWC of the plurality of first grooves 111a, may be controlled to control adhesive strength between the display panel 120 and the back cover 110 to prevent or suppress separation therebetween. Further, the row-direction widths 111aWR and 111bWR of the plurality of grooves 111 may be controlled such that the back cover 110 can have high flexibility.

As illustrated in FIG. 7B, the plurality of grooves 111 may be staggered, i.e., not aligned, with the plurality of grooves 111 in adjacent rows. For example, the plurality of first grooves 111a in one row on the front surface of the back cover 110 may be staggered in the column direction with the plurality of first grooves 111a in the adjacent rows. The plurality of second grooves 111b in one row on the other surface of the back cover 110 may be staggered with the plurality of second grooves 111b in the adjacent rows. Further, the plurality of first grooves 111a in one row on the front surface of the back cover 110 may be staggered with the plurality of second grooves 111b in the adjacent rows on the rear surface opposite to the front surface of the back cover 110. The placement of the plurality of grooves 111 shown in FIG. 7A and FIG. 7B is just an example, but is not limited thereto.

Since the plurality of first grooves 111a is staggered in the column direction from row to row, a distance 111aWB between two neighboring first grooves 111a whose centers are aligned with each other in the column direction can be reduced or minimized. Specifically, in the plurality of flexible areas MA, an area between the plurality of first grooves 111a whose centers are aligned with one another in the column direction may have relatively high rigidity. That is, in the plurality of flexible areas MA, an area where the plurality of first grooves 111a is not disposed may have higher rigidity compared to an area where the plurality of first grooves 111a is disposed. Further, during winding of the back cover 110, the back cover 110 may need to be bent in the column direction. Thus, as the length 111aWB of the partial area between the plurality of first grooves 111a whose centers are aligned in the column direction increases, it may become more difficult to bend the back cover 110 in the column direction. In this case, since the plurality of first grooves 111a is staggered from row to row, the distance 111aWB between the plurality of first grooves 111a whose centers are aligned in the column direction may be reduced or minimized, compared to a case where the plurality of first grooves 111a are not staggered from row to row. Also, the area between the plurality of first grooves 111a may be reduced or minimized. Therefore, since the plurality of first grooves 111a is staggered from row to row, the distance 111aWB between the plurality of first grooves 111a whose centers are aligned with one another in the column direction may decrease. Also, the distance 111aWB between the plurality of first grooves 111a having relatively high rigidity in the column direction may be reduced or minimized. Therefore, the flexibility of the back cover 110 may be improved so as not to interfere with winding or unwinding of the back cover 110.

Likewise, the plurality of second grooves 111b may be staggered from row to row. Thus, a distance 111bWB between two neighboring second grooves 111b whose centers are aligned in the column direction can be reduced or minimized. Specifically, in the plurality of flexible areas MA, an area between the plurality of second grooves 111b whose centers are aligned with one another in the column direction may have relatively high rigidity. That is, in the plurality of flexible areas MA, an area where the plurality of second grooves 111b is not disposed may have higher rigidity compared to an area where the plurality of second grooves 111b is disposed. Further, during winding of the back cover 110, the back cover 110 may need to be bent in the column direction. Thus, as the length 111bWB of the partial area between the plurality of second grooves 111b whose centers are aligned with one another in the column direction increases, it may become more difficult to bend the back cover 110 in the column direction. In this case, since the plurality of second grooves 111b is staggered from row to row, the distance 111bWB between the plurality of second grooves 111b whose centers are aligned with one another in the column direction can be reduced or minimized, compared to a case where the plurality of second grooves 111b are not staggered from row to row. Also, the area between the plurality of second grooves 111b can be reduced or minimized. Therefore, since the plurality of second grooves 111b may be staggered from row to row, the distance 111bWB between the plurality of second grooves 111b whose centers are aligned with one another in the column direction may decrease. Also, the distance 111bW between the plurality of second grooves 111b having relatively high rigidity in the column direction may be reduced or minimized. Therefore, the flexibility of the back cover 110 may be improved so as not to interfere with winding or unwinding of the back cover 110.

In addition, the plurality of first grooves 111a in a row on the front surface of the back cover 110 may be staggered, i.e., not aligned, with the plurality of second grooves 111b in the adjacent rows on the opposite surface, i.e., the rear surface, of the back cover 110. Thus, the plurality of second grooves 111b may be disposed to overlap the rigid area between the plurality of first grooves 111a whose centers are aligned with one another in the column direction. Also, the plurality of first grooves 111a may be disposed to overlap the rigid area between the plurality of second grooves 111b whose centers are aligned with one another in the column direction. For example, two second grooves 111b may be disposed to partially overlap the area between two neighboring first grooves 111a whose centers are aligned with each other in the column direction. Also, two first grooves 111 may be disposed to partially overlap the area between two neighboring second grooves 111b whose centers are aligned in the column direction. Thus, the plurality of second grooves 111b may be disposed on the rear surface of the back cover 110 so as to overlap the rigid area between the plurality of first grooves 111a. Therefore, it is possible to improve the flexibility of the rigid area between the plurality of first grooves 111a. Also, the plurality of first grooves 111a may be disposed on the front surface of the back cover 110 so as to overlap the rigid area between the plurality of second grooves 111b. Therefore, it is possible to improve the flexibility of the rigid area between the plurality of second grooves 111b. As such, the plurality of first grooves 111a may be staggered from from row to row, and the plurality of second grooves 111b may be staggered from row to row. In addition, a row of the plurality of first grooves 111a may also be staggered with an adjacent row of the plurality of second grooves 111b. Therefore, the flexibility of the back cover 110 may be improved so as not to interfere with winding or unwinding of the back cover 110.

Further, the plurality of grooves 111 may be placed uniformly in the entire flexible area MA of the back cover 110. Thus, during winding of the display part DP, any difference in the pressure applied to the display panel 120 from different areas of the back cover 110 may be reduced or minimized. Specifically, the pressure applied to the display panel 120 from a partial area of the back cover 110 where the plurality of grooves 111 is not disposed may be greater than the pressure applied to the display panel 120 from another partial area of the back cover 110 where the plurality of grooves 111 is disposed. When there is a significant amount of difference in pressure applied to the display panel 120 from different areas of the back cover 110, mura or the like on the display panel 120 may be seen, and the luminous efficiency of the display panel 120 may decrease. In this case, the plurality of first grooves 111a may be disposed on the front surface of the back cover 110 so as to overlap the area on the rear surface of the back cover 110 excluding an area where the plurality of second grooves 111b is disposed. Also, the plurality of second grooves 111b may be disposed on the rear surface of the back cover 110 so as to overlap the area on the front surface of the back cover 110 excluding an area where the plurality of first grooves 111a is disposed. Therefore, in the back cover 110, the plurality of first grooves 111a and the plurality of second grooves 111b may be staggered with one another, and the areas where neither the plurality of first grooves 111a nor the plurality of second grooves 111b is disposed may be reduced or minimized. Also, any difference in pressure applied to the display panel 120 from different areas of the back cover 110 may be reduced or minimized.

Figure 8:
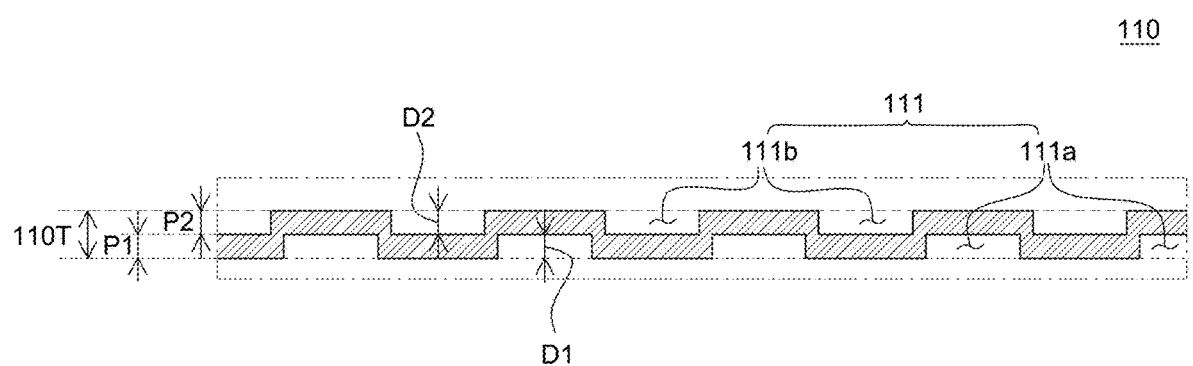
FIG. 8 is a cross-sectional view as taken along a line VIII-VIII' of FIG. 7.

As illustrated in FIG. 8, the plurality of first grooves 111a and the plurality of second grooves 111b staggered with each other may not overlap each other. Further, since the plurality of first grooves 111a and the plurality of second grooves 111b do not overlap each other, the flexible areas MA of the back cover 110 may have sufficient rigidity to support and protect the display panel 120 in the fully unwound state. If the plurality of first grooves 111a and the plurality of second grooves 111b overlap each other, a hole penetrating the back cover 110 may be formed at a point where the plurality of first grooves 111a and the plurality of second grooves 111b overlap each other. If a hole is formed, the rigidity of the back cover 110 may be degraded and the flexibility thereof may be improved. However, as an overlap area between the plurality of first grooves 111a and the plurality of second grooves 111b increases, it may become more difficult to support and protect the display panel 120 in an unwound state with the flexible areas MA of the back cover 110. Further, during winding of the display part DP, the pressure applied to the display panel 120 from the overlap area between the plurality of first grooves 111a and the plurality of second grooves 111b may become different from the pressure applied from the other area of the back cover 110. Thus, a difference in pressure applied to the display panel 120 from different areas of the back cover 110 may increase. In this case, the plurality of second grooves 111b may be disposed to overlap the area where the plurality of first grooves 111a is not disposed. Also, the plurality of first grooves 111a may be disposed to overlap the area where the plurality of second grooves 111 is not disposed. Thus, an area where neither the plurality of first grooves 111a nor the plurality of second grooves 111b is disposed may be reduced or minimized. Accordingly, the plurality of flexible areas MA of the back cover 110 may have sufficient flexibility while sufficiently supporting the display panel 120 in an unwound state.

As shown in FIG. 8, the sum of a depth D1 of the plurality of first grooves 111a and a depth D2 of the plurality of second grooves 111b may be equal to a thickness 110T of the back cover 110. Hereafter, for convenience of description, the back cover 110 will be described as being divided into a first part P1 and a second part P2. However, the first part P1 and the second part P2 of the back cover 110 may be formed as one body.

The first part P1 of the back cover 110 may be defined as a part from the front surface of the back cover 110 where the plurality of first grooves 111a is disposed to the bottom surface of the plurality of first grooves 111a. The second part P2 of the back cover 110 may be defined as a part from the surface opposite to the front surface, i.e., the rear surface, of the back cover 110 where the plurality of second grooves 111b is disposed to the bottom surface of the plurality of second grooves 111b. Further, the sum of the thickness of the first part P1, i.e., the depth D1 of the first groove 111a, and the thickness of the second part P2, i.e., the depth D2 of the second groove 111b, may be equal to the thickness 110T of the back cover 110. Thus, the plurality of first grooves 111a may be formed to expose parts of the second part P2, and the plurality of second grooves 111b may be formed to expose parts of the first part P1. Therefore, the back cover 110 may be composed of only the first part P1 where the plurality of first grooves 111a is formed and the second part P2 where the plurality of second grooves 111b is formed. Thus, the thickness 110T of the back cover 110 may be small. During winding, the back cover 110 formed of a rigid material, e.g., a metal material, such as SUS or Invar, or plastic, may be bent or broken due to high stress. However, even if the back cover 110 is formed of a rigid material, as the thickness 110T of the back cover 110 decreases, the flexibility of the back cover 110 may increase. Thus, it becomes easier to wind the back cover 110. Accordingly, as the thickness 110T of the back cover 110 decreases, stress applied to the display panel 120 from the back cover 120 during winding of the back cover 110 and the display panel 120 around the roller 151 may also decrease.

Hereafter, winding of the back cover 110, including the plurality of supporting areas PA and flexible areas MA, and the display panel 120 around the roller 151 will be described in detail with reference to FIGS. 9A through 9C.

<Winding of the Back Cover and Display Panel>

Figure 9A:
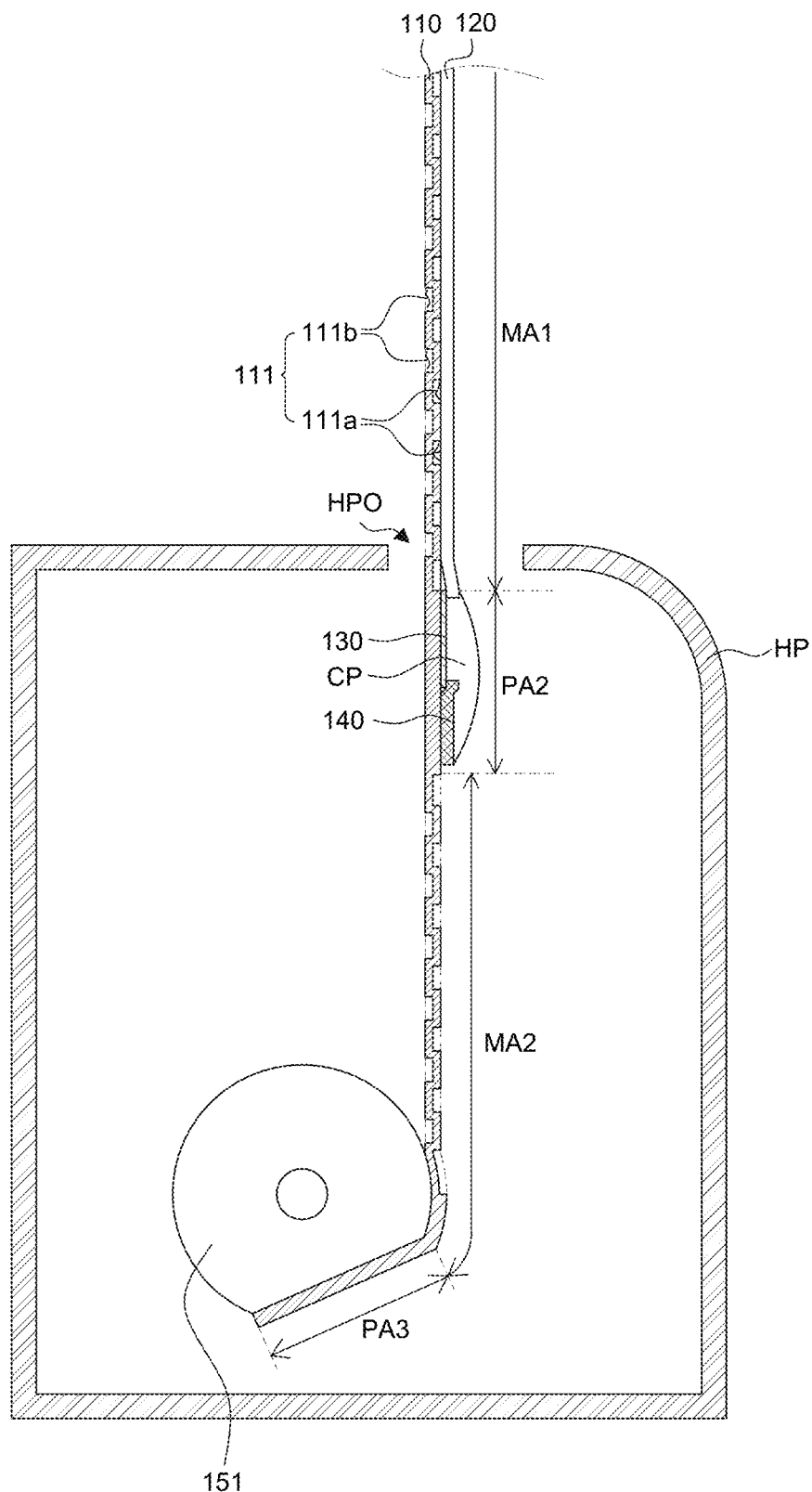
FIGS. 9A through 9C are cross-sectional views of the display device according to an example embodiment of the present disclosure.
Figure 9B:
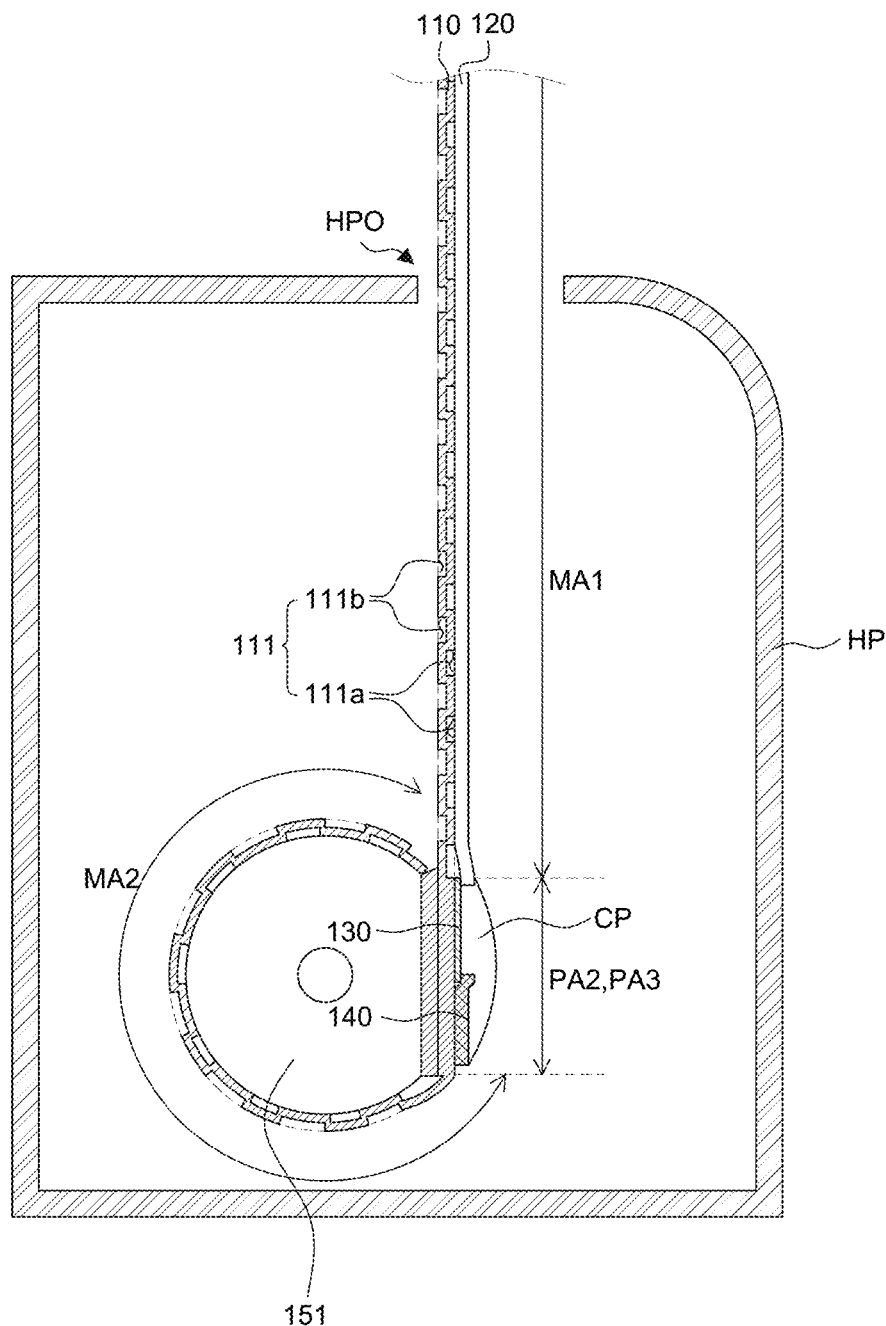
Figure 9C:
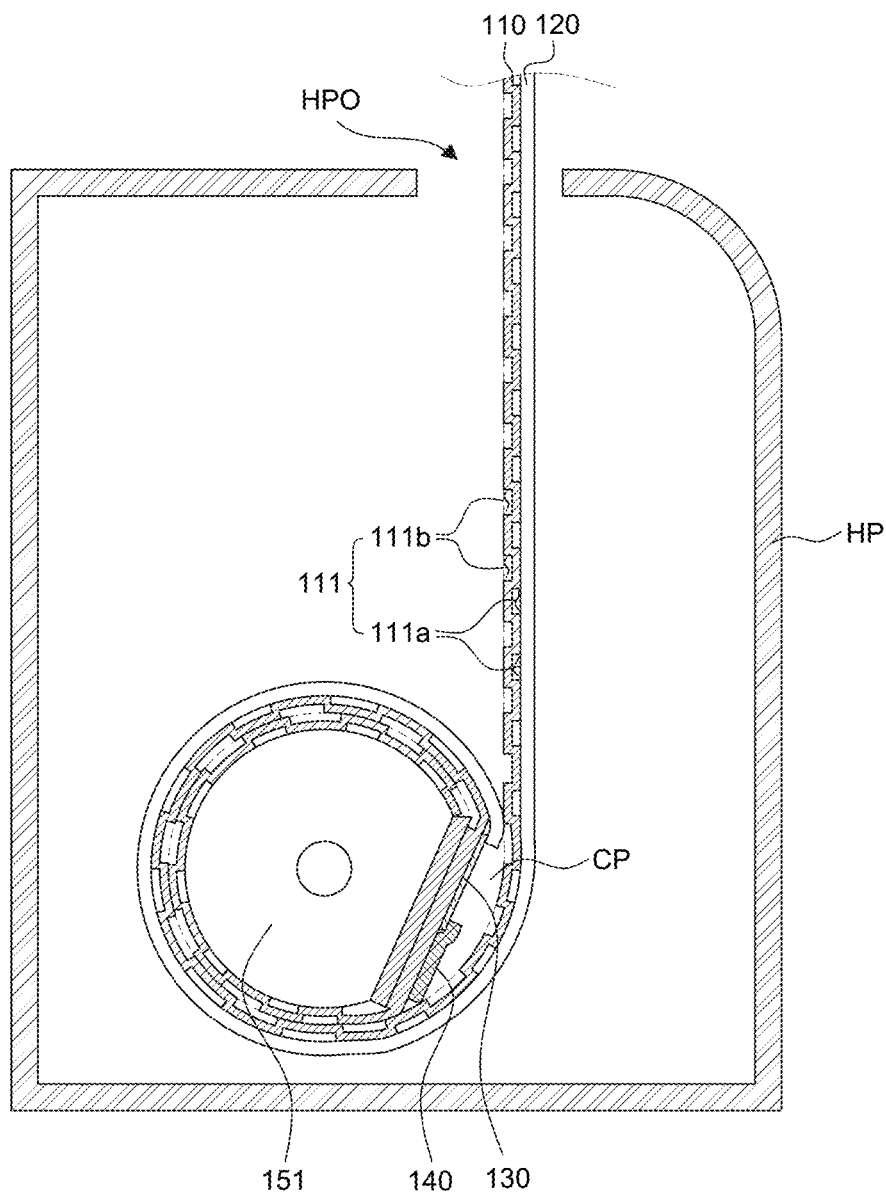

FIGS. 9A through 9C are cross-sectional views of the display device according to an example embodiment of the present disclosure. FIG. 9A is a cross-sectional view of the back cover 110 fully unwound from the roller 151. FIG. 9B is a cross-sectional view of the back cover 110 whose third supporting area PA3, second flexible area MA2, and second supporting area PA2 are wound around the roller 151. FIG. 9C is a cross-sectional view of the back cover 110 whose third supporting area PA3, second flexible area MA2, second supporting area PA2, and first flexible area MA1 are wound around the roller 151.

As illustrated in FIG. 9A, the roller 151 may have a generally cylindrical shape but may be partially flat. That is, a part of the outer peripheral surface of the roller 151 may be flat, and the other part of the outer peripheral surface may be curved.

The third supporting area PA3 may be fixed to the flat part of the roller 151. Except the third supporting area PA3 fixed to the roller 151, the other area of the back cover 110 extended from the third supporting area PA3 may be flat in a fully unwound state.

A cover part CP may be further disposed on the flexible films 130 and the printed circuit board 140 disposed in the second supporting area PA2. The cover part CP may be disposed to cover the flexible films 130 and the printed circuit board 140 and may have a convex shape. The cover part CP may protect the printed circuit board 140 and the flexible films 130. The cover part CP may be formed of an insulating material such as resin, but is not limited thereto.

As described above with reference to FIG. 7A, when the back cover 110 is in the fully unwound state, the third supporting area PA3, the second flexible area MA2, and the second supporting area PA2 of the back cover 110 may be placed inside the housing part HP. In this case, the first flexible area MA1 may be presented outside the housing part HP.

As shown in FIG. 9B, the third supporting area PA3, the second flexible area MA2, and the second supporting area PA2 of the back cover 110 may be wound around the roller 151. Further, the first flexible area MA1 extended from the second supporting area PA2 may be unwound from the roller 151.

On the flat part of the outer peripheral surface of the roller 151, the third supporting area PA3 and the second supporting area PA2 may be disposed. On the curved part of the roller 151, the second flexible area MA2 may be disposed.

The second supporting area PA2 to which the printed circuit board 140 and the flexible films 130 are attached may be wound on the flat part of the roller 151. Thus, the printed circuit board 140 and the flexible films 130 in the second supporting area PA2 can maintain a flat state without being bent. Therefore, the flexible films 130 and the printed circuit board 140 can maintain a flat state regardless of whether the display part DP is wound around or unwound from the roller 151. Also, any damage to the flexible films 130 and the printed circuit board 140 that may be caused by bending can be prevented or suppressed.

Next, as illustrated in FIG. 9C, the third supporting area PA3, the second flexible area MA2, and the second supporting area PA2 of the back cover 110 may be wound around the roller 151. A part of the first flexible area MA1 may be further wound around the roller 151.

A part of the first flexible area MA1 may be wound to overlap the curved part of the roller 151. That is, the part of the first flexible area MA1 wound on the second flexible area MA2 already wound around the curved part of the roller 151 may be bent along the shape of the curved part of the roller 151.

The other part of the first flexible area MA1 wound around the roller 151 may be wound to overlap the flat part of the roller 151. Specifically, the first flexible area MA1 may be wound around the roller 151 so as to cover the second supporting area PA2. In this case, the cover part CP may be disposed between the first flexible area MA1 and the second supporting area PA2. Therefore, the first flexible area MA1 may be wound to cover the cover part CP of the second supporting area PA2 and may be bent along the shape of the cover part CP. Since the cover part CP has a curved surface, the first flexible area MA1 may also be bent along the shape of the curved surface. Particularly, a curved upper surface of the cover part CP may correspond in shape to the roller 151. Thus, a cross section of the first flexible area MA1 wound around the roller 151 may have a substantially circular shape.

In the display device 100 according to an example embodiment of the present disclosure, the back cover 110 including the plurality of grooves 111 may be disposed on the rear surface of the display panel 120 to support and protect the display panel 120. The back cover 110 may be formed of a metal material or a similarly rigid material, and thus may have relatively high rigidity. Also, the back cover 110 may include the plurality of grooves 111 and thus may have improved flexibility. Therefore, in the fully unwound state in which the display part DP of the display device 100 is presented outside the housing part HP, the back cover 110 formed of a rigid material and having high rigidity may support the display panel 120 to be spread flat. On the other hand, in the fully wound state in which the display part DP of the display device 100 is housed inside the housing part HP, the back cover 110 having high flexibility due to the plurality of grooves 111 may be wound around the roller 151 and housed together with the display panel 120.

Further, in the display device 100 according to an example embodiment of the present disclosure, the row-direction widths 111aWR and 111bWR of the plurality of grooves 111 may be controlled such that the back cover 110 can have sufficient flexibility. Further, stress applied to the back cover 110 during winding may be reduced. Specifically, during winding of the back cover 110 and the display panel 120 around the roller 151, the back cover 110 may be bent in the column direction, and stress may be applied to expand the plurality of grooves 111 in the column direction. Since the plurality of grooves 111 has relatively large row-direction widths 111aWR and 111bWR, the plurality of grooves 111 may expand in the column direction relatively easily during winding of the back cover 110 and the display panel 120 around the roller 151. Also, stress applied to the back cover 110 may be reduced. Therefore, in the display device 100 according to an example embodiment of the present disclosure, by controlling the row-direction widths 111aWR and 111bWR of the plurality of grooves 111, the flexibility of the back cover 110 may be improved. As a result, the back cover 110 and the display panel 120 may be more easily wound around the roller 151. Further, since the plurality of grooves 111 can reduce stress applied to the back cover 110 and the display panel 120 while expanding in the column direction, damage to the display panel 120 may be suppressed.

Furthermore, in the display device 100 according to an example embodiment of the present disclosure, the column-direction widths 111aWC and 111bWC of the plurality of grooves 111 may be controlled to control adhesive strength between the back cover 110 and the display panel 120. Specifically, the display panel 120 may be attached to the first flexible area MA1 of the back cover 110. In this case, as the area of the plurality of first grooves 111a in the first flexible area MA1 on the front surface, i.e., the surface of the back cover 110 facing the display panel 120, increases, a contact area between the display panel 120 and the back cover 110 decreases. Thus, the adhesive strength between the display panel 120 and the back cover 110 may decrease. However, in the display device 100 according to an example embodiment of the present disclosure, the plurality of first grooves 111a in the back cover 110 may have small column-direction widths 111aWC and 111bWC. Thus, the area of the plurality of first grooves 111a may be reduced, and the contact area between the display panel 120 and the back cover 110 may be increased. As the contact area between the display panel 120 and the back cover 110 increases, the adhesive strength between the display panel 120 and the back cover 110 may be improved. Therefore, in the display device 100 according to an example embodiment of the present disclosure, by controlling the column-direction widths 111aWC and 111bWC of the plurality of grooves 111, the adhesive strength between the back cover 110 and the display panel 120 may be maintained at a certain level or higher to suppress separation between the back cover 110 and the display panel 120.

In addition, in the display device 100 according to an example embodiment of the present disclosure, the plurality of grooves 111 may be placed uniformly in the plurality of flexible areas MA of the back cover 110. Thus, during winding of the display part DP, any difference in pressure applied to the display panel 120 from different areas of the back cover 110 may be reduced or minimized. Specifically, the plurality of first grooves 111a may be staggered with the plurality of second grooves 111b in the flexible areas MA of the back cover 110. The plurality of second grooves 111b may be disposed in the flexible areas MA of the back cover 110 excluding an area where the plurality of first grooves 111a is disposed. Thus, the plurality of grooves 111 may be placed uniformly in the entire flexible area MA of the back cover 110. Since the plurality of first grooves 111a or the plurality of second grooves 111b is placed uniformly in the flexible areas MA of the back cover 110, any difference in pressure applied to the display panel 120 from different parts of the flexible areas MA of the back cover 110 during winding of the display part DP may be reduced or minimized. In the display device 100 according to an example embodiment of the present disclosure, the plurality of first grooves 111a and the plurality of second grooves 111b may be placed uniformly in the flexible areas MA of the back cover 110. Thus, any difference in pressure applied to the display panel 120 from different areas of the back cover 110 may be reduced or minimized to reduce or minimize any generation of mura on the display panel 120, and any decrease in the luminous efficiency of the display panel 120 may be prevented or suppressed.

Further, in the display device 100 according to an example embodiment of the present disclosure, the plurality of first grooves 111a and the plurality of second grooves 111b in the plurality of flexible areas MA of the back cover 110 may be staggered so as not to overlap each other. Thus, the back cover 110 may have both sufficient flexibility and sufficient rigidity. During winding of the display part DP, the plurality of first grooves 111a and the plurality of second grooves 111b in the plurality of flexible areas MA of the back cover 110 may be stretched in the column direction. Also, stress applied to the plurality of flexible areas MA of the back cover 110 may be reduced. Further, the plurality of flexible areas MA of the back cover 110 may be easily wound or unwound. In this case, if the plurality of first grooves 111a and the plurality of second grooves 111b overlap each other, a hole penetrating the back cover 110 may be formed at a point where the plurality of first grooves 111a and the plurality of second grooves 111b overlap each other. If a hole penetrating the back cover 110 is formed, the hole of the back cover 110 may be flexibly deformed along with the plurality of first grooves 111a and the plurality of second grooves 111b during winding. Thus, if the hole is formed where the plurality of first grooves 111a and the plurality of second grooves 111b overlap each other, the rigidity of the back cover 110 may be degraded, and the flexibility thereof may be improved. However, the back cover 110 is to be configured to protect and support the display panel 120 in an unwound state. As an overlap area between the plurality of first grooves 111a and the plurality of second grooves 111b increases, the rigidity of the back cover 110 may be degraded. Therefore, it may become more difficult to support and protect the display panel 120 with the back cover 110. Accordingly, the plurality of first grooves 111a and the plurality of second grooves 111b may be placed uniformly in the back cover 110 to secure the flexibility of the back cover 110. Also, the plurality of first grooves 111a may be disposed so as not to overlap the plurality of second grooves 111b to secure the rigidity of the back cover 110 sufficient to protect and support the display panel 120.

In the display device 100 according to an example embodiment of the present disclosure, the back cover 110 may be composed of only the first part P1 where the plurality of first grooves 111a is disposed and the second part P2 where the plurality of second grooves 111b is disposed. Thus, the thickness 110T of the back cover 110 may be small. Specifically, the first part P1 of the back cover 110 may be defined as a part from the front surface of the back cover 110 where the plurality of first grooves 111a is disposed to the bottom surface of the plurality of first grooves 111a. The second part P2 of the back cover 110 may be defined as a part from the rear surface of the back cover 110 where the plurality of second grooves 111b is disposed to the bottom surface of the plurality of second grooves 111b. Further, the plurality of first grooves 111a in the first part P1 may expose a surface of the second part P2, and the plurality of second grooves 111b in the second part P2 may expose a surface of the first part P1. That is, the back cover 110 may be composed of the first part P1 minimized to place the plurality of first grooves 111a and of the second part P2 minimized to place the plurality of second grooves 111b. In the display device 100 according to an example embodiment of the present disclosure, the back cover 110 may be composed of only the first part P1 where the plurality of first grooves 111a is placed and the second part P2 where the plurality of second grooves 111b is placed. Thus, the thickness 110T of the back cover 110 may be small. Also, the flexibility of the back cover 110 may be improved. As a result, the back cover 110 may be easily wound and unwound. Also, since the flexibility of the back cover 110 is improved, stress generated during winding of the display part DP may be reduced.

In the display device 100 according to an example embodiment of the present disclosure, the second supporting area PA2 can constantly maintain a flat state. Thus, any damage to the flexible films 130 and the printed circuit board 140 attached to the second supporting area PA2 may be reduced or minimized. The second supporting area PA2 may refer to an area where the flexible films 130 and the printed circuit board 140 are attached and can constantly maintain a flat state. Since the second supporting area PA2 is configured to maintain a flat state, there may be no need to form the plurality of grooves 111 in the second supporting area PA2. Specifically, during winding of the back cover 110 around the roller 151, the back cover 110 may be bent and wound along the shape of the roller 151. In the display device 100 according to an example embodiment of the present disclosure, the roller 151 includes a flat part on which the second supporting area PA2 may be wound. Therefore, the second supporting area PA2 may be wound flat on the roller 151 and maintain a flat state regardless of whether it is wound around or unwound from the roller 151. As a result, the flexible films 130 and the printed circuit board 140 attached to the second supporting area PA2 may also constantly maintain a flat state. For example, in a fully unwound state of the display part DP, the flexible films 130 and the printed circuit board 140 can be maintained flat by the second supporting area PA2 having high rigidity. On the other hand, in a fully wound state of the display part DP, the flexible films 130 and the printed circuit board 140 may be disposed on the flat part of the roller 151 and thus may be maintained flat. Accordingly, in the display device 100 according to an example embodiment of the present disclosure, repeated bending of the flexible films 130 and the printed circuit board 140 may be prevented or suppressed. As a result, any damage to the flexible films 130 and the printed circuit board 140 may be reduced or minimized.

<Securing Rigidity of the Back Cover>

Figure 10:
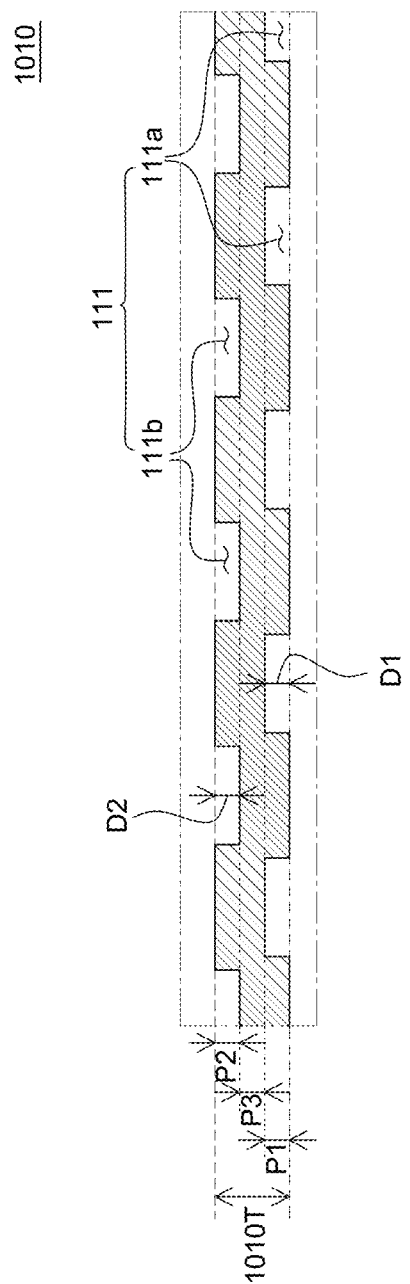
FIG. 10 is a cross-sectional view of a back cover of a display device according to another example embodiment of the present disclosure.

FIG. 10 is a cross-sectional view of a back cover of a display device according to another example embodiment of the present disclosure. An example back cover 1010 illustrated in FIG. 10 is similar to the example back cover 110 illustrated in FIGS. 1 through 9C, but further includes a third part P3. Therefore, redundant description of the same components will not be provided.

As illustrated in FIG. 10, the back cover 1010 may be composed of the first part P1 where the plurality of first grooves 111a is disposed, the second part P2 where the plurality of second grooves 111b is disposed, and a third part P3 as an intermediate part between the first part P1 and the second part P2.

Specifically, the first part P1 of the back cover 1010 may be defined as a part from the front surface of the back cover 1010 where the plurality of first grooves 111a is disposed to the bottom surface of the plurality of first grooves 111a. The second part P2 of the back cover 1010 may be defined as a part from the other surface of the back cover 1010 where the plurality of second grooves 111b is disposed to the bottom surface of the plurality of second grooves 111b. The third part P3 may be defined as a part between the bottom surface of the plurality of first grooves 111a and the bottom surface of the plurality of second grooves 111b.

Further, since the third part P3 may be further provided, a thickness 1010T of the back cover 1010 may be greater than the sum of the thickness of the first part P1, i.e., the depth D1 of the plurality of first grooves 111a, and the thickness of the second part P2, i.e., the depth D2 of the plurality of second grooves 111b.

In this case, the third part P3 may support the first part P1 and the second part P2 where the plurality of first grooves 111a and the plurality of second grooves 111b are respectively formed. Specifically, the first part P1 and the second part P2 where the plurality of grooves 111 is formed may have a lower rigidity and a higher flexibility than the third part P3 where the plurality of grooves 111 is not formed. On the other hand, the third part P3 where the plurality of grooves 111 is not formed may have a higher rigidity than the first part P1 and the second part P2 where the plurality of grooves 111 is formed. In the fully unwound state where the display part PD is presented outside the housing part HP, the third part P3 of the back cover 1010 may support the first and second parts P1 and P2 of the back cover 1010 and the display panel 120 to be spread flat.

Further, since the third part P3 supports the first and second parts P1 and P2 of the back cover 1010, it is possible to secure a margin for overlap between the plurality of first grooves 111a in the first part P1 and the plurality of second grooves 111b in the second part P2. Specifically, without the third part P3, if the plurality of first grooves 111a overlaps in part the plurality of second grooves 111b, a hole penetrating the back cover 1010 may be formed. As an overlap area between the plurality of first grooves 111a and the plurality of second grooves 111b increases, the size of the hole penetrating the back cover 1010 may also increase. In this case, the rigidity of the back cover 1010 may be degraded, and a difference in pressure applied to the display panel 120 from different areas of the back cover 1010 during winding of the display part DP may increase. With the addition of the third part P3 supporting the first and second parts P1 and P2, the rigidity of the back cover 1010 may be secured even if the plurality of first grooves 111a and the plurality of second grooves 111b overlap each other.

Accordingly, in a display device 1000 according to another example embodiment of the present disclosure, the back cover 1010 may further include the third part P3 as an intermediate part where the plurality of grooves 111 is not formed. Thus, the rigidity of the back cover 1010 may be secured. Specifically, the back cover 1010 may be composed of the first part P1 where the plurality of first grooves 111a is disposed, the second part P2 where the plurality of second grooves 111b is disposed, and the third part P3 as an intermediate part between the first part P1 and the second part P2 where the plurality of grooves 111 is not disposed. The first part P1 and the second part P2 where the plurality of first grooves 111a and the plurality of second grooves 111b are respectively disposed may have a higher flexibility and a lower rigidity than the third part P3. The back cover 1010 may be configured to support and protect the display panel 120 and thus may need to have a certain level of rigidity. Accordingly, the third part P3 having high rigidity may be further provided and be disposed between the first part P1 and the second part P2 having high flexibility and low rigidity to secure the rigidity of the back cover 1010.

Further, if the plurality of first grooves 111a overlaps the plurality of second grooves 111b, a hole penetrating the back cover 1010 may be formed at a point where the plurality of first grooves 111a overlaps the plurality of second grooves 111b. Thus, the rigidity of the back cover 1010 may be degraded. In this case, the third part P3 may be disposed between the bottom surface of the plurality of first grooves 111a and the bottom surface of the plurality of second grooves 111b to prevent or suppress the formation of any hole in the back cover 1010, thereby increasing the rigidity of the back cover 1010. Therefore, with the addition of the third part P3 in the back cover 1010, a margin for overlap between the plurality of first grooves 111a and the plurality of second grooves 111b may be secured, and the rigidity of the back cover 1010 may be increased.

<Back Cover Rollable in Several Directions>

Figure 11A:
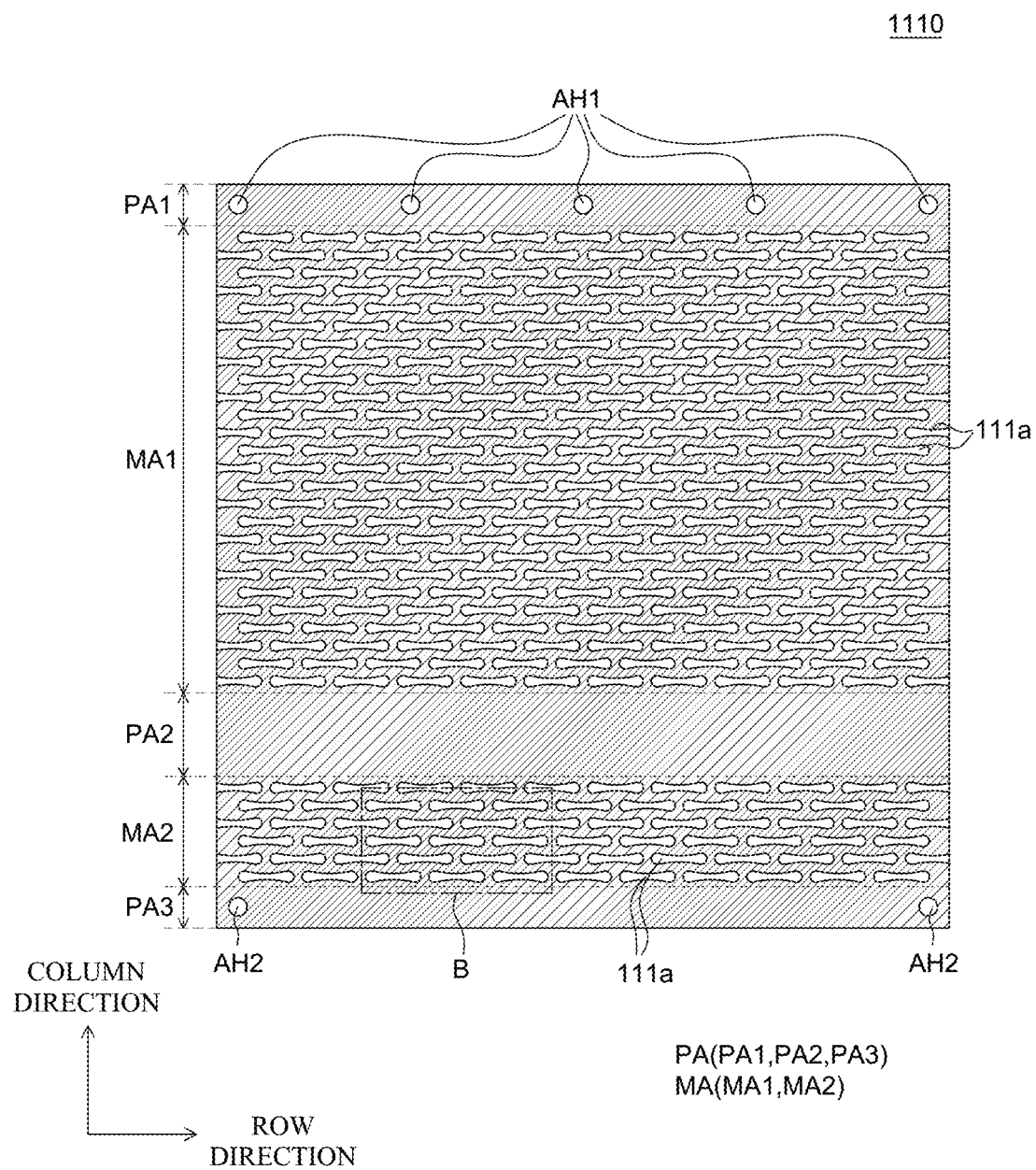
FIG. 11A is a plan view of a back cover of a display device according to yet another example embodiment of the present disclosure.
Figure 11B:
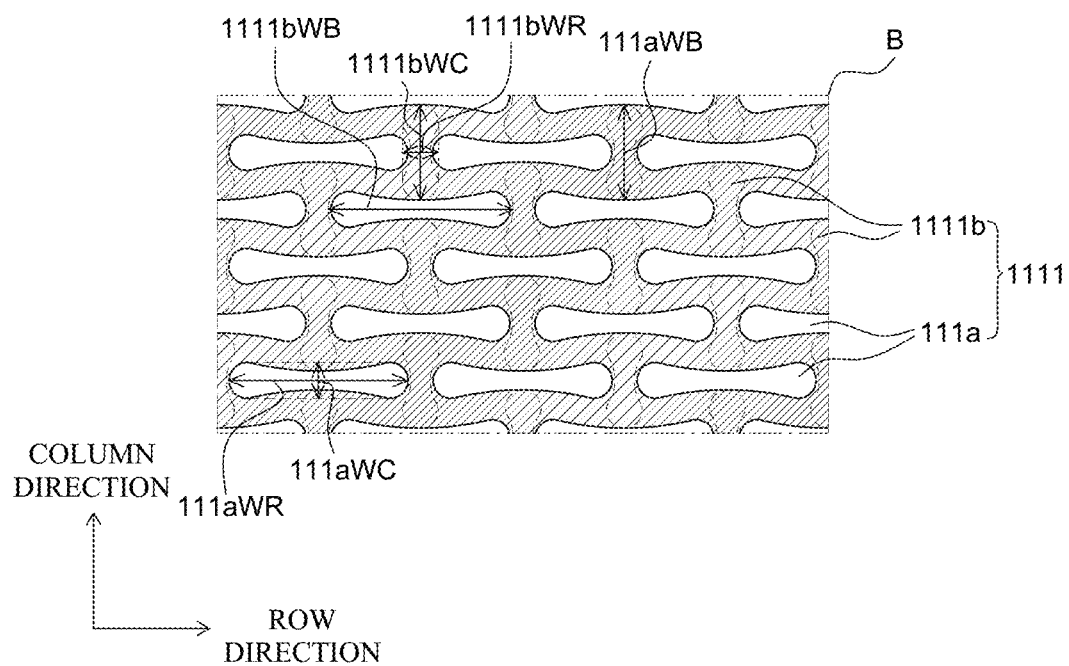
FIG. 11B is an enlarged view of a region "B" of FIG. 11A.

FIG. 11A is a plan view of a back cover of a display device according to yet another example embodiment of the present disclosure. FIG. 11B is an enlarged view of a region "B" of FIG. 11A. An example back cover 1110 illustrated in FIG. 11A and FIG. 11B may have substantially the same configuration as the example back cover 110 illustrated in FIGS. 1 through 9C, with the exception of a plurality of second grooves 1111b. Therefore, redundant description of the same components will not be provided.

As illustrated in FIG. 11A, a plurality of grooves 1111 may be disposed in the plurality of flexible areas MA of the back cover 1110. Specifically, the plurality of first grooves 111a may be placed in the plurality of flexible areas MA on one of the surfaces of the back cover 1110, e.g., the front surface of the back cover 110. Further, the plurality of second grooves 1111b may be placed in the plurality of flexible areas MA on the opposite surface, e.g., the rear surface, of the back cover 1110.

As shown in FIG. 11B, the plurality of first grooves 111a may have the maximum row-direction width 111aWR which is larger than the maximum column-direction width 111aWC. Further, the plurality of second grooves 1111b may have a maximum row-direction width 1111bWR which is smaller than a maximum column-direction width 1111bWC. That is, the maximum width 111aWR of the plurality of first grooves 111a in the row direction is larger than the maximum width 111aWC of the plurality of first grooves 111a in the column direction. Also, the maximum width 1111bWR of the plurality of second grooves 1111b in the row direction is smaller than the maximum width 1111bWC of the plurality of second grooves 1111b in the column direction.

FIG. 11A and FIG. 11B illustrate that the maximum row-direction width 111aWR of the plurality of first grooves 111a is larger than the maximum column-direction width 111aWC of the plurality of first grooves 111a. Also, FIG. 11A and FIG. 11B illustrate that the maximum row-direction width 1111bWR of the plurality of second grooves 1111b is smaller than the maximum column-direction width 1111bWC of the plurality of second grooves 1111b. However, the maximum row-direction width 1111bWR of the plurality of second grooves 1111b may be larger than the maximum column-direction width 1111bWC of the plurality of second grooves 1111b. Also, the maximum row-direction width 111aWR of the plurality of first grooves 111a may be smaller than the maximum column-direction width 111aWC of the plurality of first grooves 111a. The respective widths and placement of the plurality of first grooves 111a and the plurality of second grooves 1111b are not limited to the illustrated examples. Further, in the example of FIG. 11B, the plurality of first grooves 111a is illustrated as being larger in size than the plurality of second grooves 1111b. However, the present disclosure is not limited thereto, and the plurality of second grooves 1111b may be larger in size than the plurality of first grooves 111a.

As shown in FIG. 11B, the plurality of first grooves 111a in one row may be staggered, i.e., not aligned, with the plurality of first grooves 111a in adjacent rows. For example, the plurality of first grooves 111a in one row on one of the surfaces, e.g., the front surface, of the back cover 1110 may be staggered with the plurality of first grooves 111a in the rows adjacent to that one row.

The plurality of second grooves 1111b in one column may be staggered with the plurality of second grooves 1111b in adjacent columns. For example, the plurality of second grooves 1111b of one column on the opposite surface, e.g., the rear surface, of the back cover 1110 may be staggered with the plurality of second grooves 1111b in the columns adjacent to that one column.

When the back cover 1110 is wound to bend in the column direction of the back cover 1110, stress may be applied to expand the plurality of grooves 1111 in the column direction. In this case, if the row-direction widths 111aWR and 1111*b*WR of the plurality of grooves 1111 are set larger, when the plurality of grooves 1111 is stretched in the column direction, the column-direction stretched widths of the plurality of grooves 1111 may increase. Further, as the plurality of grooves 1111 expands in the column direction, stress applied to the flexible areas MA may be reduced. Therefore, the plurality of first grooves 111*a* having the row-direction width 111*a*WR larger than the column-direction width 111*a*WC may be placed on one of the surfaces, e.g., the front surface, of the back cover 1110. As a result, the back cover 1110 can be easily wound or unwound in the column direction, and stress applied to the flexible areas MA may be reduced.

Likewise, when the back cover 1110 is wound to bend in the row direction of the back cover 1110, stress may be applied to expand the plurality of grooves 1111 in the row direction. In this case, if the column-direction widths 111*a*WC and 1111*b*WC of the plurality of grooves 1111 are set larger, when the plurality of grooves 1111 is stretched in the row direction, the row-direction stretched widths of the plurality of grooves 1111 may increase. Further, as the plurality of grooves 1111 expands in the row direction, stress applied to the plurality of flexible areas MA may be reduced. Therefore, the plurality of second grooves 1111*b* having the column-direction width 1111*b*WC larger than the row-direction width 1111*b*WR may be placed on the other surface opposite to the one surface of the back cover 1110. As a result, the back cover 1110 can be easily wound or unwound in the row direction, and stress applied to the plurality of flexible areas MA may be reduced.

In addition, since the plurality of first grooves 111*a* is staggered from row to row, the distance 111*a*WB between the plurality of first grooves 111*a* whose centers are aligned with each other in the column direction may be reduced or minimized. Also, the back cover 1110 may be more easily wound or unwound in the column direction. Specifically, in the plurality of flexible areas MA, an area between the plurality of first grooves 111*a* whose centers are aligned with each other in the column direction may have relatively high rigidity. That is, in the plurality of flexible areas MA, an area where the plurality of first grooves 111*a* is not disposed may have higher rigidity compared to an area where the plurality of first grooves 111*a* is disposed. Further, during winding of the back cover 1110 in the column direction, the back cover 1110 may need to be bent in the column direction. Thus, as the length 111*a*WB of the partial area between the plurality of first grooves 111*a* whose centers are aligned with each other in the column direction increases, it may become more difficult to bend the back cover 1110 in the column direction. In this case, since the plurality of first grooves 111*a* is staggered from row to row, the distance 111*a*WB between the plurality of first grooves 111*a* whose centers are aligned with each other in the column direction may be reduced or minimized, compared to a case where the plurality of first grooves 111*a* are not staggered from row to row. Also, the area between the plurality of first grooves 111*a* may be reduced or minimized. Therefore, since the plurality of first grooves 111*a* is staggered from row to row, the distance 111*a*WB between the plurality of first grooves 111*a* whose centers are aligned in the column direction may decrease. Also, the distance 111*a*W between the plurality of first grooves 111*a* having rigidity in the column direction may be reduced or minimized. Therefore, the flexibility of the back cover 1110 may be improved so as not to interfere with winding or unwinding of the back cover 1110 in the column direction.

Further, the plurality of second grooves 1111*b* may be staggered, i.e., not aligned, from column to column. Thus, a distance 1111*b*WB between the plurality of second grooves 1111*b* whose centers are aligned with each other in the row direction may be reduced or minimized. Also, the back cover 1110 may be more easily wound or unwound in the row direction. Specifically, in the plurality of flexible areas MA, an area between the plurality of second grooves 1111*b* whose centers are aligned with each other in the row direction may have relatively high rigidity. That is, in the plurality of flexible areas MA, an area where the plurality of second grooves 1111*b* is not disposed may have higher rigidity compared to an area where the plurality of second grooves 1111*b* is disposed. Further, during winding of the back cover 1110 in the row direction, the back cover 1110 may need to be bent in the row direction. Thus, as the length 1111*b*WB of the partial area between the plurality of second grooves 1111*b* whose centers are aligned with each other in the row direction increases, it may become more difficult to bend the back cover 1110 in the row direction. In this case, since the plurality of second grooves 1111*b* is staggered from column to column, the distance 1111*b*WB between the plurality of second grooves 1111*b* whose centers are aligned with each other in the row direction may be reduced or minimized, compared to a case where the second grooves 1111*b* are not staggered from column to column. Also, the area between the plurality of second grooves 1111*b* may be reduced or minimized. Accordingly, since the plurality of second grooves 1111*b* is staggered from column to column, the distance 1111*b*WB between the plurality of second grooves 1111*b* whose centers are aligned in the row direction may decrease. Also, the distance 1111*b*WB between the plurality of second grooves 1111*b* having rigidity in the row direction may be reduced or minimized. Therefore, the flexibility of the back cover 1110 may be improved so as not to interfere with winding or unwinding of the back cover 1110 in the row direction.

Moreover, the second grooves 1111*b* having a long axis in the column direction may be disposed on one of the surfaces, e.g., the front or rear surface, of the back cover 1110 so as to overlap the rigid area between the plurality of first grooves 111*a* whose centers are aligned with each other in the column direction on the opposite surface of the back cover 1110. Also, the first grooves 111*a* having a long axis in the row direction may be disposed to overlap the rigid area between the plurality of second grooves 1111*b* whose centers are aligned with each other in the row direction. For example, a second groove 1111*b* may be disposed to overlap substantially the entire area between the centers of two neighboring first grooves 111*a* whose centers are aligned with each other in the column direction. Also, a first groove 111*a* may be disposed to overlap substantially the entire area between the centers of two neighboring second grooves 1111*b* whose centers are aligned with each other in the row direction. Thus, the second grooves 1111*b* may be disposed on one of the surfaces, e.g., the front or rear surface, of the back cover 1110 so as to overlap the rigid area between the plurality of first grooves 111*a* on the opposite surface of the back cover 1110. Therefore, it is possible to improve the flexibility of the rigid area between the plurality of first grooves 111*a*. Also, the first grooves 111*a* may be disposed on one of the surfaces of the back cover 1110 so as to overlap the rigid area between the plurality of second grooves 1111*b* on the opposite surface of the back cover 1110. Therefore, it is possible to improve the flexibility of the rigid area between the plurality of second grooves 1111*b*.

In the display device according to yet another example embodiment of the present disclosure, the plurality of first grooves 111a having a long axis in the row direction may be disposed on one of the surfaces of the back cover 1110. Also, the plurality of second grooves 1111b having a long axis in the column direction may be disposed on the opposite surface of the back cover 1110. Thus, the back cover 1110 may be easily wound or unwound in both the row direction and the column direction. Specifically, when the back cover 1110 is wound to bend in the column direction, the plurality of first grooves 111a having the row-direction width 111aWR larger than the column-direction width 111aWC may expand in the column direction, thereby reducing the stress applied to the back cover 1110. When the back cover 1110 is wound to bend in the row direction, the plurality of second grooves 1111b having the column-direction width 1111bWC larger than the row-direction width 1111bWR may expand in the row direction, thereby reducing the stress applied to the back cover 1110. Therefore, in the display device according to yet another example embodiment of the present disclosure, because the plurality of first grooves 111a and the plurality of second grooves 1111b of the back cover 1110 may reduce the stress generated when the back cover 1110 is wound in the column direction and the row direction, respectively, the back cover 1110 may be wound and unwound in both the column direction and the row direction.

In the display device according to yet another example embodiment of the present disclosure, the plurality of first grooves 111a disposed on one of the surfaces of the back cover 1110 and having a long axis in the row direction may be staggered with the plurality of second grooves 1111b disposed on the opposite surface of the back cover 1110 and having a long axis in the column direction. Thus, the flexibility of the back cover 1110 may be improved. For example, the greater the length 111aWB of the area between the plurality of first grooves 111a whose centers are aligned in the column direction, it may be more difficult to bend the back cover 1110 in the column direction during winding of the back cover 1110 in the column direction. In this case, the second grooves 1111b having a long axis in the column direction may be disposed between the first grooves 111a whose centers are aligned with each other in the column direction. Therefore, it is possible to improve the flexibility of the rigid area between the plurality of first grooves 111a whose centers are aligned with each other in the column direction. Also, the greater the length 1111bWB of the partial area between the plurality of second grooves 1111b whose centers are aligned with each other in the row direction, it may be more difficult to bend the back cover 1110 in the row direction during winding of the back cover 1110 in the row direction. In this case, the first grooves 111a having a long axis in the row direction may be disposed between the second grooves 1111b whose centers are aligned with each other in the row direction. Therefore, it is possible to improve the flexibility of the rigid area between the plurality of second grooves 1111b whose centers are aligned with each other in the row direction. That is, the plurality of first grooves 111a and the plurality of second grooves 1111b having long axes in different directions from each other may be staggered with each other. Thus, the plurality of second grooves 1111b may be disposed in the rigid area between the plurality of first grooves 111a to improve the flexibility. Also, the plurality of first grooves 111a may be disposed in the rigid area between the plurality of second grooves 1111b to improve the flexibility. Therefore, the back cover 1110 may be more easily wound or unwound.

<Filling Member>

Figure 12:
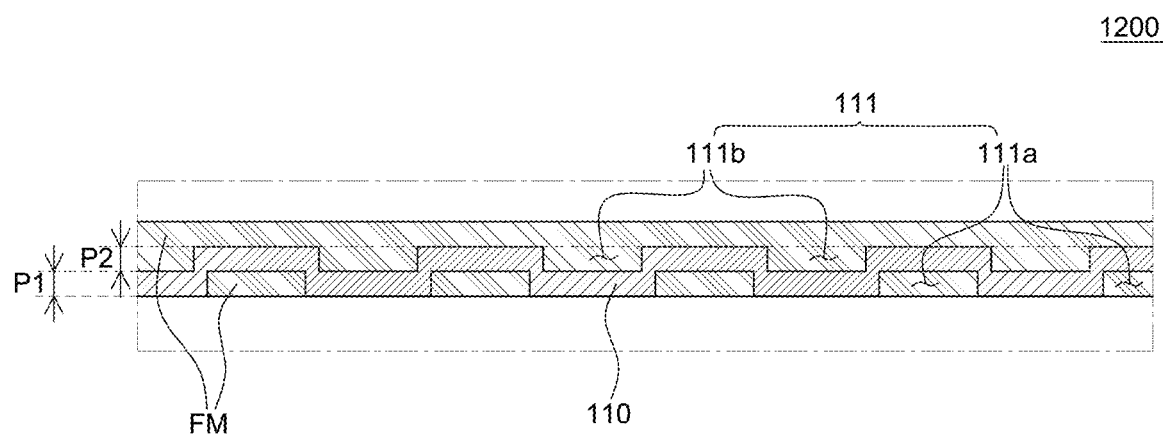
FIG. 12 is a cross-sectional view of a display device according to still another example embodiment of the present disclosure.

FIG. 12 is a cross-sectional view of a display device according to still another example embodiment of the present disclosure. A display device 1200 illustrated in FIG. 12 may have substantially the same configuration as the display device 100 illustrated in FIGS. 1 through 9C, except the addition of a filling member FM. Therefore, redundant description of the same components will not be provided. FIG. 12 illustrates only a back cover 110 (see, e.g., FIGS. 6 and 8) and the filling member FM among various components of the display device 1200.

As illustrated in FIG. 12, the filling member FM may fill the plurality of first grooves 111a and the plurality of second grooves 111b. The filling member FM may fill the plurality of first grooves 111a of the first part P1 and the plurality of second grooves 111b of the second part P2. The filling member FM may fill the grooves to cover one or both of the surfaces of the back cover 110. For example, the filling member FM may be formed of an insulating material, such as resin, but is not limited thereto.

FIG. 12 illustrates, for example, that the filling member FM fills in the plurality of second grooves 111b and also covers the entire outer surface of the second part P2 of the back cover 110. However, the present disclosure is not limited thereto, and the filling member FM may fill in only the plurality of second grooves 111b without covering the outer surface of the second part P2.

Further, FIG. 12 illustrates, for example, that the filling member FM fills both the plurality of first grooves 111a and the plurality of second grooves 111b. However, the present disclosure is not limited thereto. For example, the filling member FM may fill the plurality of first grooves 111a and not the plurality of second grooves 111b. As another example, the filling member FM may fill the plurality of second grooves 111b and not the plurality of first grooves 111a.

During winding of the display part DP, the display part DP may be wound several times around the roller 151 to be fully housed inside the housing part HP. Further, when the display part DP is wound around the roller 151, one of the surfaces, e.g., the rear surface, of the back cover 110 may be brought into contact with a top surface of the display panel 120 (see, e.g., FIG. 6) that is attached to the opposite surface, e.g., the front surface, of the back cover 110. In this case, the plurality of second grooves 111b may be disposed in the rear surface of the back cover 110, and the plurality of second grooves 111b may come in contact with the top surface of the display panel 120. The rear surface of the back cover 110 in which the plurality of second grooves 111b is disposed may be uneven and rough. In this case, the display panel 120 may be wound around the roller 151 and be brought into contact with the rear surface of the back cover 110, and damages, such as scratches, may occur on the surface of the display panel 120. Here, the filling member FM filling the plurality of first grooves 111a and/or the plurality of second grooves 111b may be provided to make one or both surfaces the back cover 110 even. Also, the filling member FM may protect the top surface of the display panel 120 to be in contact with the rear surface of the back cover 110 against scratches or the like.

Further, since the filling member FM may fill the plurality of grooves 111, the back cover 110 with the filling member FM may provide flat top and bottom surfaces. Thus, during winding, any difference in stress applied to the display panel 120 from different areas of the back cover 110 may be reduced. Specifically, if the filling member FM is not provided, on the surfaces including the plurality of first grooves 111a or the plurality of second grooves 111b, there may be a difference in pressure applied to the display panel 120 between an area where the plurality of first grooves 111a is disposed and an area where the plurality of second grooves 111b is disposed. Further, if the filling member FM is not provided, there may be a difference in pressure applied to the display panel 120 between an area where the plurality of grooves 111 is disposed and an area where the plurality of grooves 111 is not disposed. As such, if there is a difference in pressure applied from different areas of the back cover 110 to the display panel 120, mura or the like on the display panel 120 may be seen, and the luminous efficiency of the display panel may decrease. In the display device 1200 according to still another example embodiment of the present disclosure, the filling member FM filling the plurality of grooves 111 may be used. Thus, the back cover 110 with the filling member FM may provide flat top and bottom surfaces. Therefore, any difference in pressure applied from different areas of the back cover 110 to the display panel 120 may be reduced or minimized.

Various example embodiments of the present disclosure can also be described as follows:

According to an aspect of the present disclosure, a display device may include: a display panel having a plurality of pixels and configured to be wound or unwound; and a back cover attached to one surface of the display panel and having a plurality of grooves. The grooves may include a plurality of first grooves placed on the one surface of the back cover and a plurality of second grooves placed on the other surface of the back cover opposite to the one surface of the back cover. A depth of each of at least one of the first grooves and at least one of the second grooves may be smaller than a maximum thickness of the back cover.

A sum of a depth of one of the first grooves and a depth of one of the second grooves may be substantially equal to the maximum thickness of the back cover.

A sum of a depth of one of the first grooves and a depth of one of the second grooves may be smaller than the maximum thickness of the back cover.

The back cover may further include an intermediate part between the one surface of the back cover and the other surface of the back cover.

The first grooves may be not aligned with the second grooves.

The first grooves may overlap at least a part of the second grooves.

The display panel may be configured to be wound or unwound in a first direction. At least one of the first grooves and at least one of the second grooves may each have a width in the first direction which is smaller than a width in a second direction perpendicular to the first direction.

The display panel may be configured to be wound or unwound in a first direction and in a second direction perpendicular to the first direction. At least one of the first grooves may have a width in the first direction which is smaller than a width in the second direction. At least one of the second grooves may have a width in the first direction which is larger than a width in the second direction.

The display device may further include a filling member filling one or more of the first grooves and the second grooves.

The filling member may cover one or both of the one surface and the other surface of the back cover.

The grooves may have at least one of a rectangular shape, an oval shape, a ribbon shape, a dumbbell shape, and a diamond shape.

The display device may further include a roller configured to wind or unwind the display panel and the back cover, and a housing configured to house the display panel and the back cover in a wound state.

In another aspect of the present disclosure, a display device may include: a display panel configured to display an image; a back cover supporting the display panel, and including a plurality of first grooves and a plurality of second grooves, the first grooves being on one surface of the back cover and the second grooves being on another surface of the back cover; a housing part configured to house the display panel and the back cover; and a roller unit configured to wind or unwind the display panel and the back cover at least in a column direction.

The first grooves and the second grooves may be staggered from each other.

The first grooves may overlap at least a part of the second grooves.

The first grooves may not overlap the second grooves in plan view.

The back cover may further include a first part in which the first grooves are disposed and a second part in which the second grooves are disposed. The first part and the second part may be integrated into a single body.

The back cover may further include an intermediate part between the first part and the second part. The intermediate part may be integrated into the single body with the first part and the second part.

The back cover may further include a supporting area at a lowermost end of the back cover and fixed to the roller unit; and a flexible area between the supporting area and an uppermost end of the back cover, and overlapping the display panel. The first grooves and the second grooves may be placed in the flexible area.

At least one of the first grooves may have a width in the column direction which is smaller than a width in a row direction, and at least one of the second grooves may have a width in the column direction which is smaller than a width in the row direction.

At least one of the first grooves may have a width in the column direction which is smaller than a width in a row direction, and at least one of the second grooves may have a width in the column direction which is larger than a width in the row direction.

Although the exemplary embodiments of the present disclosure are described above in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only and are not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following appended claims, and all the technical concepts in the equivalent scope thereof should be construed as falling within the scope of the present disclosure.

It will be apparent to those skilled in the art that various modifications and variations can be made in the display device of the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:
   a display panel having a plurality of pixels and configured to be wound or unwound; and
   a back cover attached to one surface of the display panel and having a plurality of grooves,
   wherein the grooves include:
      a plurality of first grooves placed on the one surface of the back cover facing the one surface of the display panel; and
      a plurality of second grooves placed on the other surface of the back cover opposite to the one surface of the back cover, and
   wherein a depth of each of at least one of the first grooves and at least one of the second grooves is smaller than a maximum thickness of the back cover.

2. The display device according to claim 1, wherein a sum of a depth of one of the first grooves and a depth of one of the second grooves is substantially equal to the maximum thickness of the back cover.

3. The display device according to claim 1, wherein a sum of a depth
   of one of the first grooves and a depth of one of the second grooves is smaller than the maximum thickness of the back cover.

4. The display device according to claim 3, wherein the back cover further includes an intermediate part between the one surface of the back cover and the other surface of the back cover.

5. The display device according to claim 1, wherein the first grooves are not aligned with the second grooves.

6. The display device according to claim 1, wherein the first grooves overlap at least a part of the second grooves.

7. The display device according to claim 1, wherein the display panel is configured to be wound or unwound in a first direction, and
   wherein at least one of the first grooves and at least one of the second grooves each has a width in the first direction which is smaller than a width in a second direction perpendicular to the first direction.

8. The display device according to claim 1, wherein:
   the display panel is configured to be wound or unwound in a first direction and in a second direction perpendicular to the first direction, and
   at least one of the first grooves has a width in the first direction which is smaller than a width in the second direction, and
   at least one of the second grooves has a width in the first direction which is larger than a width in the second direction.

9. The display device according to claim 1, further comprising:
   a filling member filling one or more of the first grooves and the second grooves.

10. The display device according to claim 9, wherein the filling member covers one or both of the one surface and the other surface of the back cover.

11. The display device according to claim 1, wherein the grooves have at least one of a rectangular shape, an oval shape, a ribbon shape, a dumbbell shape, and a diamond shape.

12. The display device according to claim 1, further comprising:
   a roller configured to wind or unwind the display panel and the back cover; and
   a housing configured to house the display panel and the back cover in a wound state.

13. A display device, comprising:
   a display panel configured to display an image;
   a back cover supporting one surface of the display panel, and including a plurality of first grooves and a plurality of second grooves, the first grooves being on one surface of the back cover facing the one surface of the display panel and the second grooves being on another surface of the back cover;
   a housing part configured to house the display panel and the back cover; and
   a roller unit configured to wind or unwind the display panel and the back cover at least in a column direction.

14. The display device according to claim 13, wherein the first grooves and the second grooves are staggered from each other.

15. The display device according to claim 13, wherein the first grooves overlap at least a part of the second grooves.

16. The display device according to claim 13, wherein the first grooves do not overlap the second grooves in plan view.

17. The display device according to claim 13, wherein the back cover further includes:
   a first part in which the first grooves are disposed; and
   a second part in which the second grooves are disposed, and
   wherein the first part and the second part are integrated into a single body.

18. The display device according to claim 17, wherein the back cover further includes an intermediate part between the first part and the second part, the intermediate part being integrated into the single body with the first part and the second part.

19. The display device according to claim 13, wherein the back cover further includes:
   a supporting area at a lowermost end of the back cover and fixed to the roller unit; and
   a flexible area between the supporting area and an uppermost end of the back cover, and overlapping the display panel, and
   wherein the first grooves and the second grooves are placed in the flexible area.

20. The display device according to claim 13, wherein:
   at least one of the first grooves has a width in the column direction which is smaller than a width in a row direction, and
   at least one of the second grooves has a width in the column direction which is smaller than a width in the row direction.

21. The display device according to claim 13, wherein:
   at least one of the first grooves has a width in the column direction which is smaller than a width in a row direction, and
   at least one of the second grooves has a width in the column direction which is larger than a width in the row direction.

* * * * *